US005913226A

United States Patent [19]

Sato

[11] Patent Number: 5,913,226

[45] Date of Patent: Jun. 15, 1999

[54] SNOOP CACHE MEMORY CONTROL SYSTEM AND METHOD

[75] Inventor: Masaki Sato, Tokyo, Japan

[73] Assignee: Oki Electric Industry Co., Ltd., Tokyo, Japan

[21] Appl. No.: 08/779,154

[22] Filed: Jan. 3, 1997

[30] Foreign Application Priority Data

Feb. 14, 1996 [JP] Japan .................................... 8-050963

[51] Int. Cl.[6] ..................................................... G06F 12/00

[52] U.S. Cl. .......................... 711/146; 711/144; 711/145; 711/141

[58] Field of Search .................................... 711/146, 145, 711/144, 119, 147, 153, 141

[56] References Cited

U.S. PATENT DOCUMENTS

| | | | |
|---|---|---|---|
| 4,622,631 | 11/1986 | Frank et al. . | |
| 5,097,409 | 3/1992 | Schwartz et al. . | |
| 5,265,235 | 11/1993 | Sindhu et al. | 395/425 |
| 5,297,269 | 3/1994 | Donaldson et al. | 395/425 |
| 5,434,993 | 7/1995 | Liencres et al. | 395/425 |
| 5,535,363 | 7/1996 | Prince | 395/474 |

OTHER PUBLICATIONS

Archibald, James and Baer, Jean–Loup, "Cache Coherence Protocols: Evaluation Using a Multiprocessor Simulation Model", Nov. 1986, ACM Transactions on Computer Systems, vol. 4, No. 4, pp. 273–298.

Jim Handy, "The Cache Memory Book", Academic Press 1993, pp. 153–158.

*Primary Examiner*—Eddie P. Chan
*Assistant Examiner*—Kimberly McLean
*Attorney, Agent, or Firm*—Rabin & Champagne, P.C.

[57] ABSTRACT

To implement a system minimizing access to the shared memory, the previous owner number storage module contains the number of a cache memory or the shared memory which was the previous owner of data. When the cache control module expels a copy of data from the snoop cache memory module, it references the previous owner number storage module and, if it contains the number of a cache memory, passes the ownership to the snoop cache memory module with that number.

19 Claims, 24 Drawing Sheets

START
S1 SHARED FLAG "0"? (Y / N)
S2 DIRTY FLAG "1"? (Y / N)
S3 WRITE BACK TO SHARED MEMORY PROCESSING
S4 DIRTY FLAG "1"? (Y / N)
S5 OWNERSHIP DELIVERY PROCESSING 1
S6 OWNER FLAG "1"? (Y / N)
S7 OWNERSHIP DELIVERY PROCESSING 2
S8 MISS-HIT BLOCK TRANSFER PROCESSING
S9 READ DATA PROCESSING
END

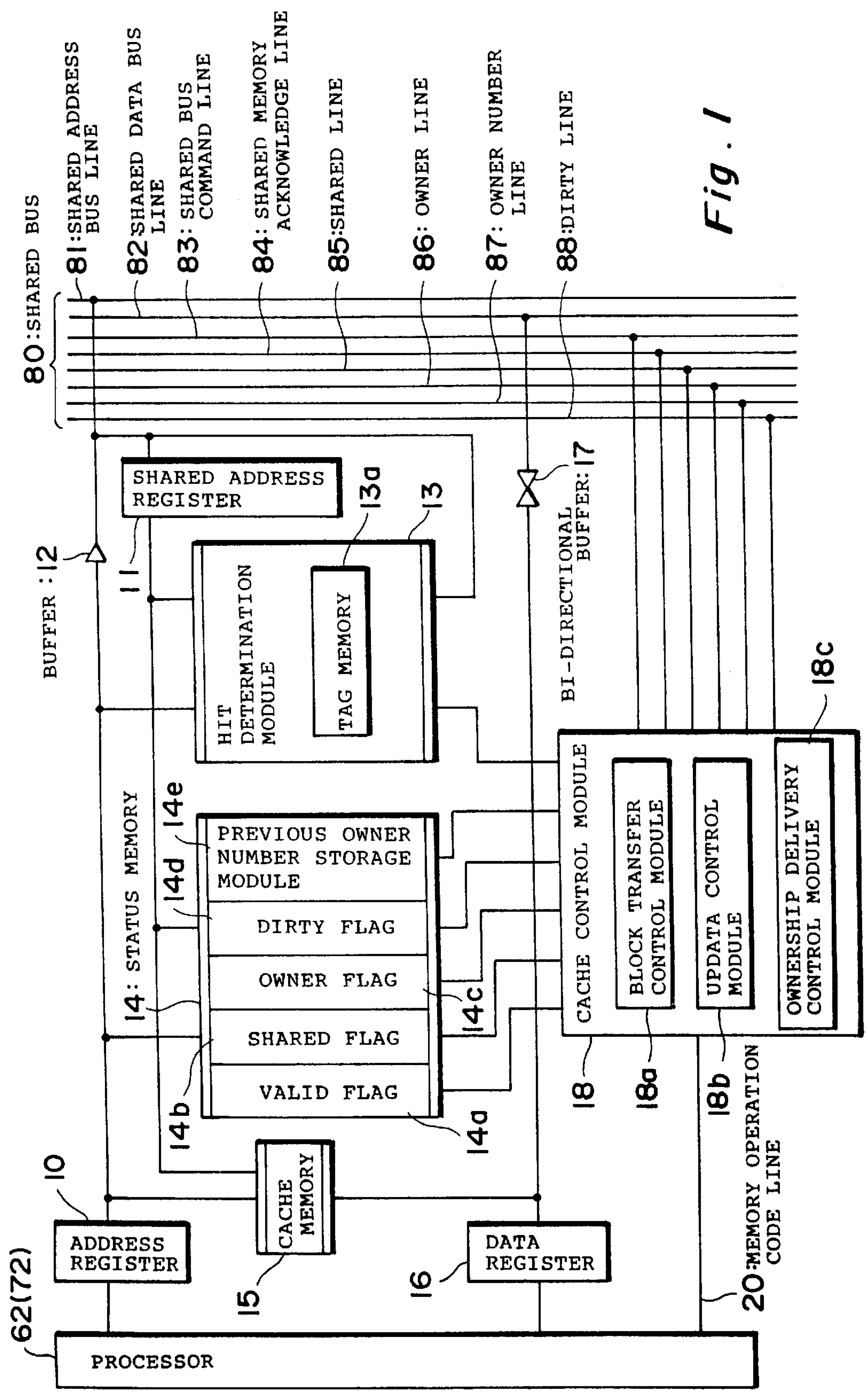
80:SHARED BUS
81:SHARED ADDRESS BUS LINE
82:SHARED DATA BUS LINE
83: SHARED BUS COMMAND LINE
84: SHARED MEMORY ACKNOWLEDGE LINE
85:SHARED LINE
86: OWNER LINE
87: OWNER NUMBER LINE
88:DIRTY LINE
Fig. 1
SHARED ADDRESS REGISTER
11
BUFFER :12
13a
13
HIT DETERMINATION MODULE
TAG MEMORY
BI-DIRECTIONAL BUFFER:17
14: STATUS MEMORY
14e
14d
PREVIOUS OWNER NUMBER STORAGE MODULE
DIRTY FLAG
OWNER FLAG
SHARED FLAG
VALID FLAG
14c
14b
14a
CACHE CONTROL MODULE
BLOCK TRANSFER CONTROL MODULE
UPDATA CONTROL MODULE
OWNERSHIP DELIVERY CONTROL MODULE
18c
18
18a
18b
20:MEMORY OPERATION CODE LINE
10
ADDRESS REGISTER
CACHE MEMORY
15
DATA REGISTER
16
62(72)
PROCESSOR 81: SHARED ADDRESS BUS LINE
82: SHARED DATA BUS LINE
83: SHARED BUS COMMAND LINE
84: SHARED MEMORY ACKNOWLEDGE LINE
85: SHARED LINE
86: OWNER LINE
87: OWNER NUMBER LINE
88: DIRTY LINE
SHARED BUS: 80
50
SHARED MEMORY
71
72
SNOOP CACHE MEMORY
PROCESSOR
70: COMPONENT PROCESSOR
SNOOP CACHE MEMORY
PROCESSOR
60: COMPONENT PROCESSOR
61
62

START
SHARED FLAG "0"?
S1
Y
N
DIRTY FLAG "1"?
S2
Y
N
WRITE BACK TO SHARED MEMORY PROCESSING
S3
DIRTY FLAG "1"?
S4
Y
N
OWNERSHIP DELIVERY PROCESSING 1
S5
OWNER FLAG "1"?
S6
Y
N
OWNERSHIP DELIVERY PROCESSING 2
S7
MISS-HIT BLOCK TRANSFER PROCESSING
S8
READ DATA PROCESSING
S9
E N D

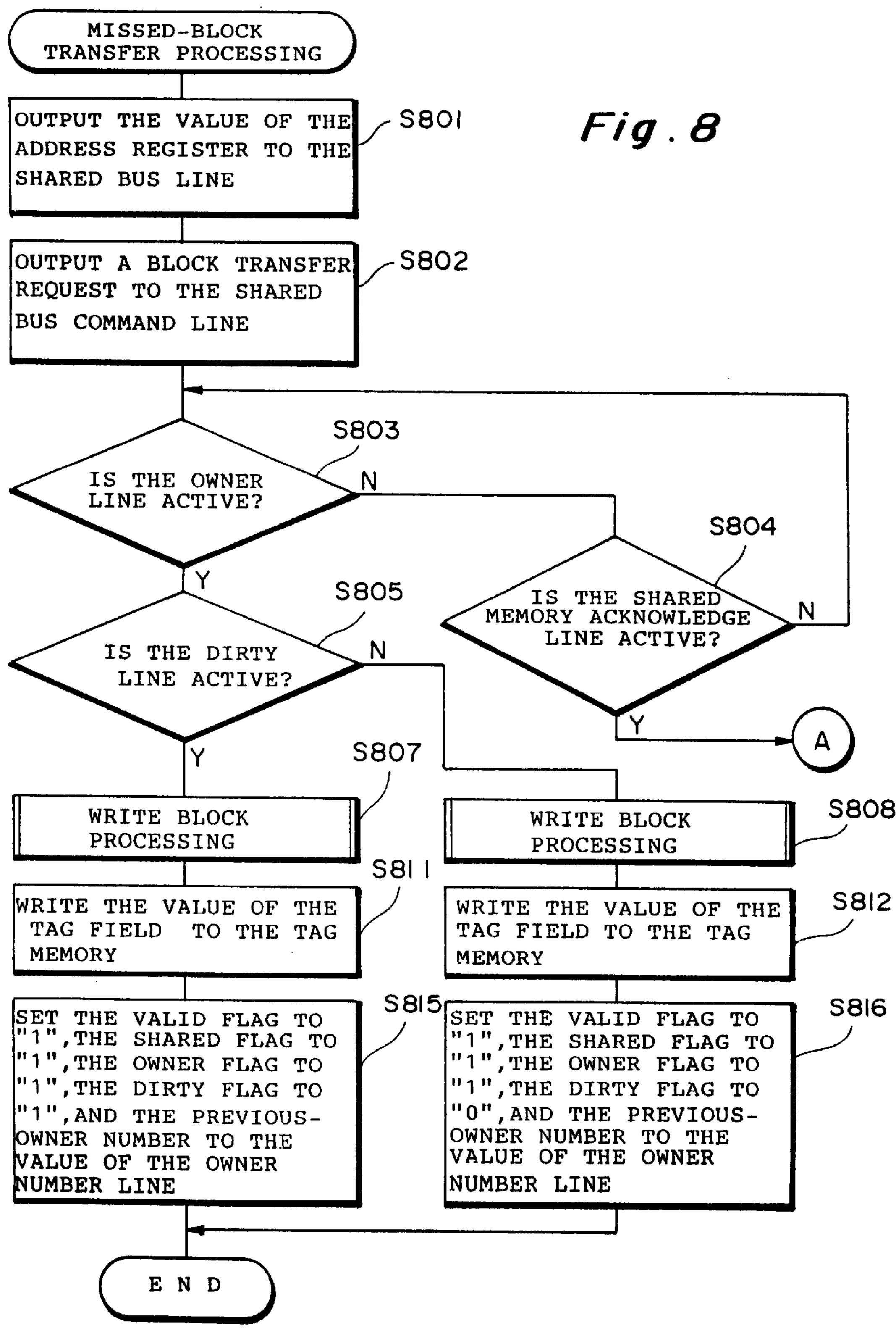

MISSED-BLOCK TRANSFER PROCESSING
OUTPUT THE VALUE OF THE ADDRESS REGISTER TO THE SHARED BUS LINE
S801
Fig. 8
OUTPUT A BLOCK TRANSFER REQUEST TO THE SHARED BUS COMMAND LINE
S802
S803
IS THE OWNER LINE ACTIVE?
N
Y
S804
IS THE SHARED MEMORY ACKNOWLEDGE LINE ACTIVE?
N
Y
A
S805
IS THE DIRTY LINE ACTIVE?
N
Y
S807
WRITE BLOCK PROCESSING
S808
WRITE BLOCK PROCESSING
S811
WRITE THE VALUE OF THE TAG FIELD TO THE TAG MEMORY
S812
WRITE THE VALUE OF THE TAG FIELD TO THE TAG MEMORY
S815
SET THE VALID FLAG TO "1",THE SHARED FLAG TO "1",THE OWNER FLAG TO "1",THE DIRTY FLAG TO "1",AND THE PREVIOUS-OWNER NUMBER TO THE VALUE OF THE OWNER NUMBER LINE
S816
SET THE VALID FLAG TO "1",THE SHARED FLAG TO "1",THE OWNER FLAG TO "1",THE DIRTY FLAG TO "0",AND THE PREVIOUS-OWNER NUMBER TO THE VALUE OF THE OWNER NUMBER LINE
END

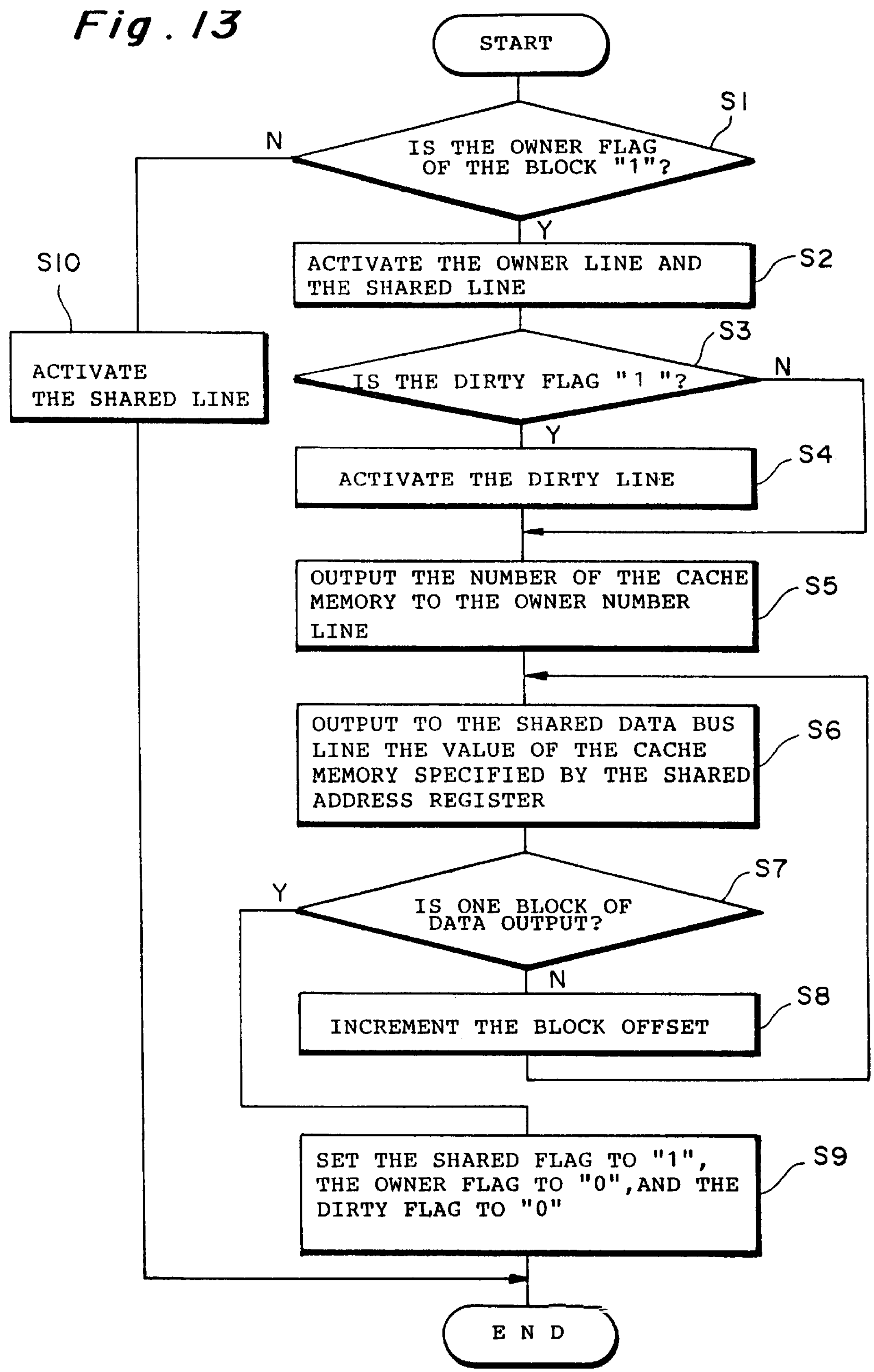
Fig. 13
START
S1
IS THE OWNER FLAG OF THE BLOCK "1"?
N
Y
S2
ACTIVATE THE OWNER LINE AND THE SHARED LINE
S10
ACTIVATE THE SHARED LINE
S3
IS THE DIRTY FLAG "1 "?
N
Y
S4
ACTIVATE THE DIRTY LINE
OUTPUT THE NUMBER OF THE CACHE MEMORY TO THE OWNER NUMBER LINE
S5
OUTPUT TO THE SHARED DATA BUS LINE THE VALUE OF THE CACHE MEMORY SPECIFIED BY THE SHARED ADDRESS REGISTER
S6
S7
IS ONE BLOCK OF DATA OUTPUT?
Y
N
S8
INCREMENT THE BLOCK OFFSET
SET THE SHARED FLAG TO "1", THE OWNER FLAG TO "0", AND THE DIRTY FLAG TO "0"
S9
E N D 81: SHARED ADDRESS BUS LINE
82: SHARED DATA BUS LINE
83: SHARED BUS COMMAND LINE
84: SHARED MEMORY ACKNOWLEDGE LINE
89: SHARED LINE
88: DIRTY LINE
SHARED BUS: 80
50
SHARED MEMORY
71
72
SNOOP CACHE MEMORY
PROCESSOR
70: COMPONENT PROCESSOR
SNOOP CACHE MEMORY
PROCESSOR
60: COMPONENT PROCESSOR
61
62

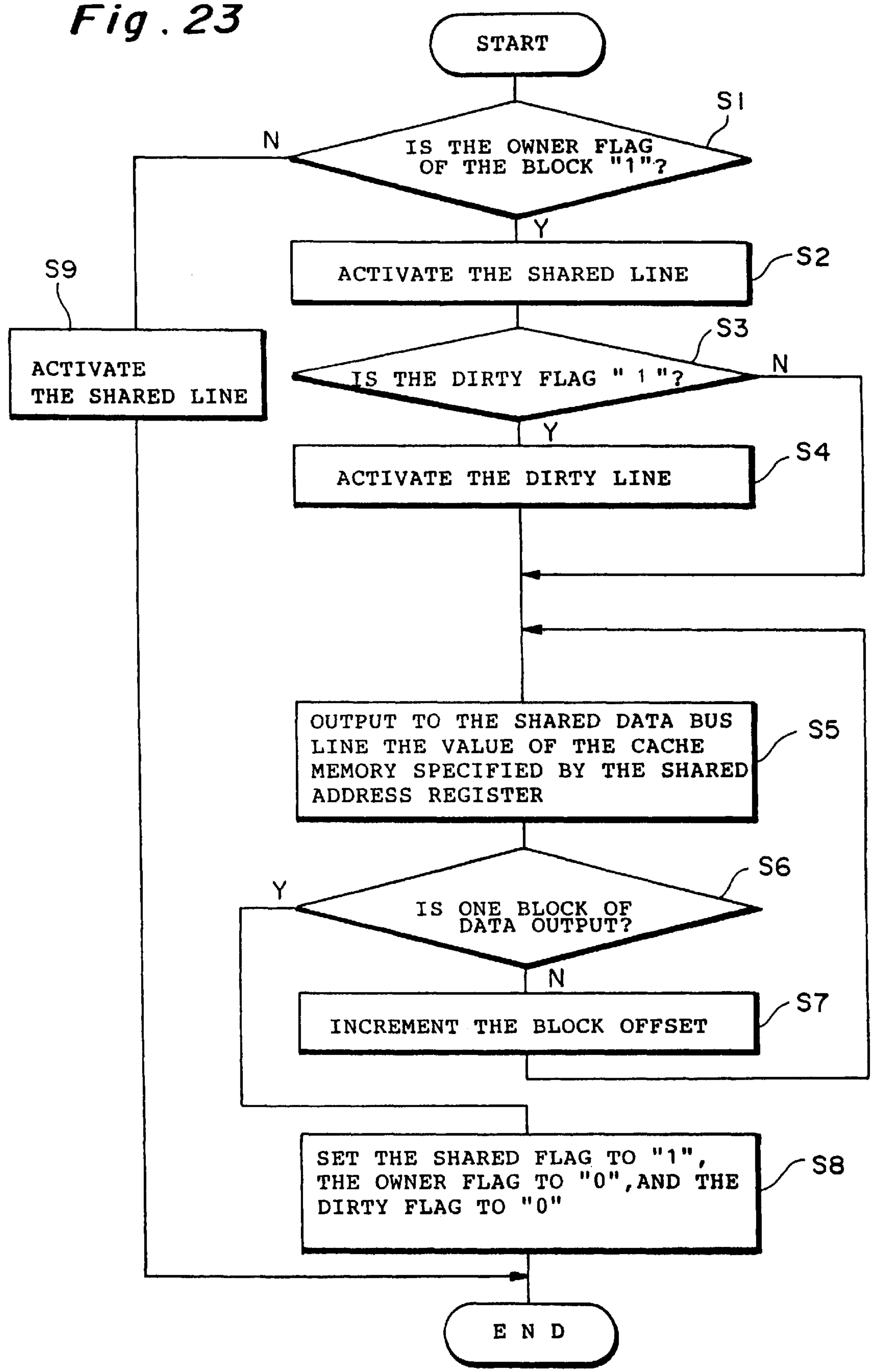

Fig. 23
START
IS THE OWNER FLAG OF THE BLOCK "1"?
S1
N
Y
ACTIVATE THE SHARED LINE
S2
S9
ACTIVATE THE SHARED LINE
IS THE DIRTY FLAG " 1 "?
S3
N
Y
ACTIVATE THE DIRTY LINE
S4
OUTPUT TO THE SHARED DATA BUS LINE THE VALUE OF THE CACHE MEMORY SPECIFIED BY THE SHARED ADDRESS REGISTER
S5
IS ONE BLOCK OF DATA OUTPUT?
S6
Y
N
INCREMENT THE BLOCK OFFSET
S7
SET THE SHARED FLAG TO "1", THE OWNER FLAG TO "0", AND THE DIRTY FLAG TO "0"
S8
END

SNOOP CACHE MEMORY CONTROL SYSTEM AND METHOD

BACKGROUND OF THE INVENTION

1. Field of the Invention

The present invention relates to a cache memory control method used in a shared-bus multiprocessor system. More specifically, it relates to a snoop cache memory control system which ensures the consistency of data among cache memories connected through the common bus to the shared memory.

2. Description of the Prior Art

In the field of a shared-bus multiprocessor system where a plurality of processors are connected through the shared bus to the shared memory, it is well known that each processor has its own cache memory to speed up processing and to reduce the bus traffic. This method requires a mechanism which, when data is written to one of a plurality of cache memories, ensures the consistency of data among the cache memories. This type of shared bus multiprocessor system ensures consistency by allowing the cache memory of each processor to monitor the bus transactions of the other cache memories. A cache memory like this is called a snoop cache memory. Several snoop cache memory control methods have been proposed to manage cache memory.

One of the conventional snoop cache memory control methods is as follows. When a cache miss occurs in a cache memory and some other cache memory has a block containing the missed data, this method transfers the block, not from the slow-access shared memory, but directly from the cache memory containing it, thus minimizing the data transfer overhead.

In this case, because there may be one or more cache memories where a block containing the missed data is stored, it is necessary to determine a cache memory from which the missed data is to be transferred to the cache memory where the cache miss occurred. One of the methods for accomplishing this is to pre-define the cache memory acting as the owner of a block. This method is employed in the snoop cache memory of the Berkeley scheme or Dragon scheme introduced, for example, in the following documents: James Archibald, et al., "Cache Coherence Protocols: Evaluation Using a Multiprocessor Simulation Model", acm Transactions on Computer Systems, 1986, November, Vol. 4, Number 4, pp. 273–298. If data in the block is modified and it does not match that in the shared memory, the cache memory is responsible for writing data back to the shared memory when it expels the block.

That is, the owner cache memory, which has a block containing data cache-missed (not detected in the cache) by some other cache memory, must transfer the block to that cache memory. In addition, when the owner cache memory expels a modified block, it must write back the block to the shared memory.

However, the method described above has the following problems. First, when a cache memory expels a block it owns (that is, the owner of the block) and, after that, a cache miss occurs for that block in some other cache memory, that cache memory must transfer the block from the shared memory.

For example, once the owner cache memory expels a block, some other non-owner cache memory having the same block cannot transfer the block to another cache memory because only the owner has the block transfer authority. As a result, a cache miss in any of the cache memories under this condition would cause the block to be transferred from the shared memory, increasing the block transfer overhead.

Second, when a cache memory modifies a block it owns and then expels the block, it must write the block back to the shared memory. So, when a non-owner cache memory, which has a block already written back to the shared memory by the owner, modifies that block, it must write the block back to the shared memory again. The non-owner cache memory does this in order to match the data in the cache memory with that in the shared memory. That is, the block written back by the owner is replaced by the block written back by the non-owner cache memory, meaning that the write-back by the owner is wasteful.

In view of the foregoing, there has been a need for a snoop cache memory control system designed around the ownership of a block of data in which a block is transferred between cache memories, if possible, with the minimum access to the shared memory.

SUMMARY OF THE INVENTION

It is an object of the present invention to provide a snoop cache memory control system which allows the ownership to be moved among cache memories to reduce the number of times the write-back to the shared memory is performed.

To achieve this object, the snoop cache memory control system according to the present invention has means for storing the number of the cache memory of the previous owner. And, when the system expels a block of data it owns, it transfers the ownership to the previous owner.

Therefore, if data owned by a cache memory does not match that in the shared memory but if the previous owner has data with the same address as that in the current cache memory, the current cache memory does not have to write back data to the shared memory but simply transfers the ownership to the previous owner. As a result, the snoop cache memory control method according to the present invention, which transfers the ownership to the previous owner as described above, eliminates the need for the write-back operation which would otherwise be necessary. This, in turn, reduces the number of times each cache memory must access the shared memory.

In addition, because the ownership is transferred among cache memories, it is more likely that, when a cache miss occurs in one of the cache memories, data is transferred among cache memories. This reduces the number of times access must be made to the shared memory when a cache miss occurs.

BRIEF DESCRIPTION OF THE DRAWINGS

The present invention will be understood more fully from the detailed description and the accompanying drawings below of the preferred embodiments of the invention.

In the drawings:

FIG. 1 is a configuration diagram showing the first embodiment of the snoop cache memory control system according to this invention.

FIG. 8 is a flowchart (1/2) showing the block transfer processing which is performed when a miss hit occurs in the first embodiment of the snoop cache memory control system according to this invention.

FIG. 13 is a flowchart showing the processing that is performed when a cache hit occurs upon receiving a block transfer request from the shared bus in the first embodiment of the snoop cache memory control system according to this invention.

FIG. 23 is a flowchart showing the processing that is performed when a cache hit occurs upon receiving a block transfer request from the shared bus in the second embodiment of the snoop cache memory control system according to this invention.

DESCRIPTION OF THE PREFERRED EMBODIMENTS

First Embodiment

Figure 2:
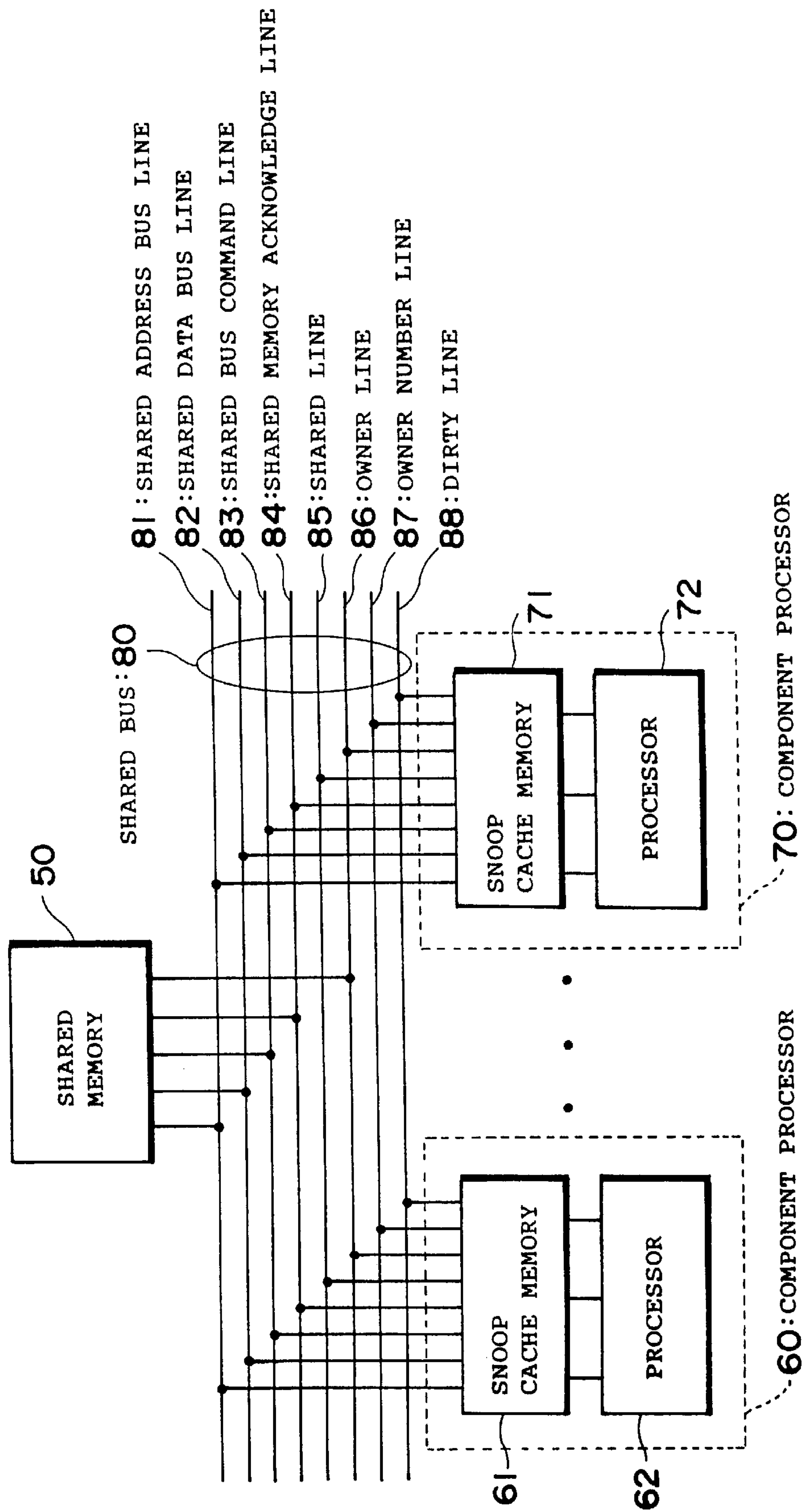
FIG. 2 is a configuration diagram showing the shared-bus multiprocessor system implemented by the snoop cache memory control system according to the first embodiment of this invention.

An owner of data is defined as having the following two characteristics: first, it is "a cache memory from which, when a cache miss occurs in one of a plurality of cache memories each connected to the shared memory, the missed data is sent to the requesting cache memory" and secondly it is "a cache memory responsible for writing back data, as it is expelled from the cache memory to the shared memory, if the data does not match that in the shared memory." In the first embodiment, the owner of a data block has the number of the previous owner stored and, when the snoop cache memory module expels a block it owns, the owner checks if the previous owner has a block with the same address. When the previous owner has a block with the same address, the owner delivers the ownership to the previous owner. The ownership is moved from one snoop cache memory to another in this manner. Thereafter, when a miss cache occurs in one of snoop cache memories for the block, it is transferred from the snoop cache memory of the new owner. This reduces the number of times access must be made to the shared memory.

In the first embodiment, an owner is defined as "a cache memory responsible for writing back data, as it is expelled from the cache memory to the shared memory, if the data does not match that in the shared memory." And, when the snoop cache memory module of the owner writes data back to the shared memory and the snoop cache memory of the previous owner has a block of data with the same address, the owner delivers the ownership to the previous owner. This means that, from this point on, the snoop cache memory module of the previous owner is used for the snoop cache memory of the owner which is going to write data back to the shared memory, eliminating the need to write back data to the shared memory at this point in time. This reduces the number of times data must be written to the shared memory.

In addition, in the first embodiment, when a cache miss occurs in one of the snoop cache memory modules and the snoop cache memory module receives the missed block, the snoop cache memory module causing the cache miss becomes the owner of the block. Thus, the ownership is delivered not only from the owner snoop cache memory module to the previous-owner snoop cache memory module but also, when a cache miss occurs, from the owner to the snoop cache memory module, causing the cache miss. This allows the block to stay in one of snoop cache memory modules longer, increasing the probability that the block is transferred between snoop cache memory modules when a cache miss occurs.

In addition, when a snoop cache memory module modifies data in the first embodiment, the snoop cache memory module becomes the owner of the modified block. Thus, the ownership is delivered not only from the owner snoop cache memory module to the previous-owner snoop cache memory module but also, when a block is modified, from the owner to the snoop cache memory module modifying the block. This allows the block to stay in one of snoop cache memory modules longer, increasing the probability that the block is transferred between snoop cache memory modules when a cache miss occurs.

FIG. 1 is a configuration diagram of the first embodiment of the snoop cache memory control system according to the present invention. Before describing this embodiment, the following explains the configuration of a shared-bus multiprocessor system where the snoop cache memory control system according to the present invention is used.

FIG. 2 is a configuration diagram of the shared-bus multiprocessor system. The system shown in the figure has the shared memory 50 and a plurality of component processors 60–70. Each of the component processors 60 to 70 has a snoop cache memory module and a processor; for example, the component processor 60 has the snoop cache memory module 61 and the processor 62. The snoop cache memory modules 61–71 each are connected to the shared memory 50 via the shared bus 80.

The shared bus 80 consists of eight lines: the shared address bus line 81 through which a common address is transferred to the shared memory 50 and the snoop cache memory modules 61–71, the shared data bus line 82 through which data is transferred, the shared bus command line 83 through which a block read request or an update request is transferred, the shared memory acknowledge line 84 through which the timing signal used when a cache block is written back to, or read from, the shared memory 50 is transferred, the shared line 85 indicating that, when a block is transferred upon detecting a cache miss, another snoop cache memory module 71 (or 61) shares the block with the current snoop cache memory module 61 (or 71), the owner line 86 indicating that, when a block is transferred upon detecting a cache miss, there is the owner of the block, the dirty line 88 indicating that the block is modified, and the owner number line 87 indicating, when the block is transferred from a cache memory and when a shared data block is updated, the cache memory number of the previous owner of the block and indicating the number of a cache memory to which the ownership is to be transferred when making an ownership delivery request during the replacement processing that is performed upon detecting a cache miss.

As shown in the figure, the common bus lines, from the shared address bus line 81 to the dirty line 88, are connected to the shared memory 50 and each of snoop cache memory modules 61–71. Note that the owner line 86 is used to indicate that there is a response when an owner delivery request is made during replacement processing performed upon detecting a cache miss and that the data of the owner block is updated during shared data block update processing.

Figure 3:
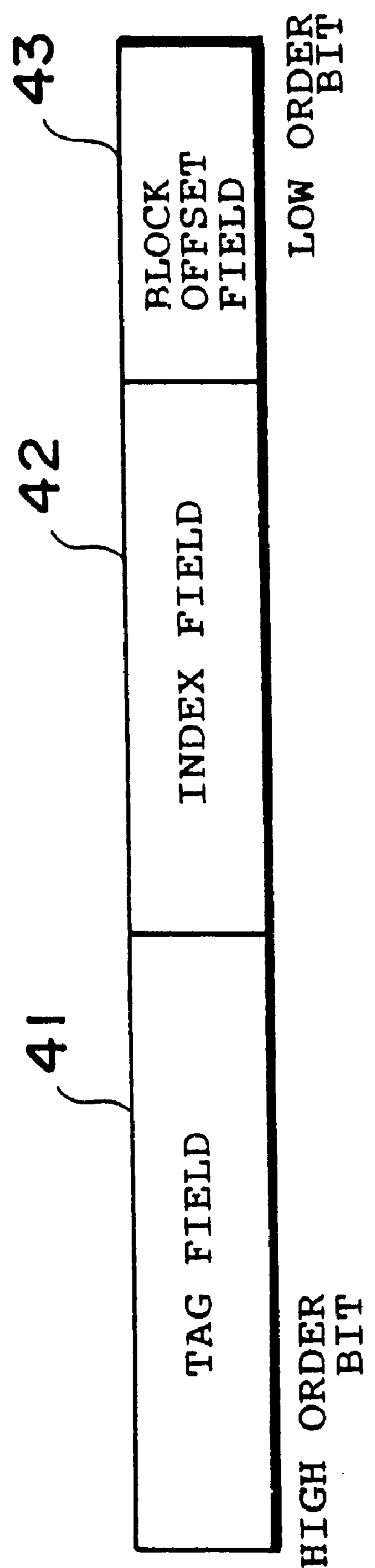
FIG. 3 is an illustration of the address configuration of the snoop cache memory of this invention.

The configuration of an address used in this embodiment is as follows. FIG. 3 illustrates the configuration of an address used in this embodiment. As shown in the figure, an address consists of the tag field 41, index field 42, and block offset 43. The location of a block in the shared memory 50 is indicated by the values in the tag field 41 and the index field 42, the location of data within a block being indicated by the value in the block offset field 43. The location of a block in the cache memory is indicated by the value in the index field 42.

Referring to FIG. 1, there is shown the snoop cache memory control system of this embodiment. The configuration in this figure shows only the snoop cache memory module 61, processor 62, and shared bus shared bus 80 of the components shown in FIG. 2. The snoop cache memory module 71 and the processor 72, similar to the snoop cache memory module 61 and processor 62 in configuration, are omitted in this figure.

The snoop cache memory module 61 comprises: the address register 10 in which an address used when access is made from the processor 62 is stored, the shared address register 11 in which an address used when access is made from the shared memory 50 is stored, the buffer 12 used when the value of the address register 10 is output to the shared bus 80, the hit determination module 13 which compares the value of the address register 10 or shared address register 11 with the value of the tag memory 13*a* described later and which determines whether a cache hit occurs (that is, whether the desired data is found in the cache memory), the status memory 14 containing information as to whether the current snoop cache memory module 61 is the owner of the block, the cache memory 15 in which a caching block is stored, the data register 16 in which data read from the cache memory 15 or data to be written from the processor 62 to the cache memory 15 is stored temporarily, the bidirectional buffer 17 used to transfer data between the shared data bus line 82 and the cache memory 15 or data register 16, and the cache control module 18 controlling the operation of the cache memory 15.

The memory operation code line 20 and the shared bus lines, from the shared bus command line 83 to the dirty line 88, are connected to the cache control module 18. In addition, the shared data bus line 82 is connected to the cache memory 15 and the data register 16 via the bidirectional buffer 17. The shared address bus line 81 is connected to the address register 10 via the buffer 12 and to the shared address register 11 and the hit determination module 13.

The hit determination module 13 contains the tag memory 13*a* and the hit determination circuit of the cache memory 15 which is not shown in the figure. The tag memory 13*a* contains the value of the tag field 41 corresponding to the value of each block stored in the cache memory 15.

The status memory 14 comprises: the valid flag 14*a* indicating that the block in the cache memory 15 is valid, the shared flag 14*b* indicating that there is a possibility that the snoop cache memory module shares the block with some other snoop cache memory, the owner flag owner flag 14*c* indicating that the snoop cache memory is the owner of the block, the dirty flag 14*d* indicating that the processor 62 has modified the block, and the previous owner number storage module 14*e* in which the previous owner number identifying the original snoop cache memory module is stored when the owner is transferred, for example, when the block is transferred from some other snoop cache memory to the snoop cache memory. The snoop cache memories are assigned sequentially with numbers, beginning with 1. The number of 0 indicates the shared memory 50. The cache control module 18 checks these flags and sets values in them.

The cache control module 18 references the previous owner number storage module 14*e* when it expels data stored in the cache memory 15. It has the block transfer control module 18*a,* update control module 18*b,* and ownership delivery control module 18*c* for use when the previous owner number storage module 14*e* contains the number of one of snoop cache memories.

When data is transferred between snoop cache memories upon detecting a cache miss, the block transfer control module 18*a* of the source snoop cache memory module sends the number of the source snoop cache memory module and the ownership delivery request to the destination snoop cache memory module. When the block transfer control module of the destination snoop cache memory module receives the ownership delivery request, it makes the destination snoop cache memory module the owner of the block and, at the same time, stores the number of the source snoop cache memory module in the previous owner number storage module 14*e*. On the other hand, when the block is transferred from the shared memory 50 when a cache miss occurs, the block transfer control module stores the number of the shared memory 50 in the previous owner number storage module 14*e.*

When data in the snoop cache memory module is modified and when the owner of the data is one of other snoop cache memory modules, the update control module 18*b* sends the update request for the data to the snoop cache memory module of the owner. And, when the update control module receives the ownership delivery request from the owner to which the update request was sent, it makes its own snoop cache memory module the owner of the data and, at the same time, stores in the previous owner number storage module the number of the snoop cache memory module from which the owner delivery request was received.

When the snoop cache memory module expels data for which it has the ownership, the ownership delivery control module 18*c* checks if one or more of other snoop cache memory module also contain the data. When any of the other snoop cache memory modules contains the data, the ownership delivery control module references the previous owner number storage module 14*e* to see if it contains the number of some other snoop cache memory module. If it contains such a number, the ownership delivery control module sends the number and the owner delivery request to the snoop cache memory module of the previous owner. On the other hand, when the snoop cache memory module receives an ownership delivery request and the owner number in the request indicates this snoop cache memory module and when this snoop cache memory module contains data whose ownership was delivered, the ownership delivery control module makes this snoop cache memory module the owner of the data.

A data read/write request from the processor 62 is sent to the cache control module 18 through the memory operation code line 20. A block transfer request and a data update request are transferred between the other snoop cache memory modules on the shared bus 80 or the shared memory 50 and the cache control module 18 through the shared bus command line 83.

The address of data that is read from or written to the tag memory 13*a* of the hit determination module 13 or the status memory 14 is specified by the value of the index field 42 of the address register 10 or shared address register 11. The address of data read from or written to the cache memory 15 is specified by the value of the index field 42 and the value of block offset field 43 of the address register 10 or the shared address register 11.

The following explains how the snoop cache memory module works. Because the operation of the snoop cache memory module 61 is similar to the operation of snoop cache memory module 71, the following explains only the operation of the snoop cache memory module 61:

Control is passed first to the hit determination processing module when access is made to the snoop cache memory module 61.

When an access request is sent to the snoop cache memory module 61 via the memory operation code line 20 from the processor 62 or via the shared bus command line 83 on the shared bus 80, the hit determination module 13 first checks whether the request will hit the desired data. To do so, the hit determination module compares the value of the tag memory 13*a* specified by the index field 42 of the address register 10 or shared address register 11 (=value of the tag field of the block stored in the cache memory 15) with the value of the tag field 41 stored in the address register 10 or shared address register 11 (=value of the tag field of the address specified by the access request). The cache control module 18 checks the match signal obtained from the comparison executed in the hit determination module 13 and the valid flag in the status memory 14 specified by the index field 42 of the address register 10 or the shared address register 11.

The hit determination module determines that the request will hit the desired data if the match signal is active and the valid flag is "1". Unless otherwise stated, it is assumed in the following discussion that an address used for processing a request from the processor 62 is stored in the address register 10 and that an address used for processing a request from the shared bus 80 is stored in the shared address register 11. It is also assumed that one of the registers, address register or shared address register, is selected depending upon whether the request is from the processor 62 or from the shared bus 80 and that an address stored in the register is sent to the cache memory 15, status memory 14, and hit determination module 13.

Depending upon the result of the hit determination processing and whether the request is from the processor 62 or from the shared bus 80, the subsequent processing is divided into the following seven categories:

(1) A cache hit occurs (that is, the desired data is found in the cache memory) upon receiving a read request from the processor 62

(2) A cache miss occurs (that is, the desired data is not found in the cache memory) upon receiving a read request from the processor 62

(3) A cache hit occurs upon receiving a write request from the processor 62

(4) A cache miss occurs upon receiving a write request from the processor 62

(5) A cache hit occurs upon receiving a block transfer request from the shared bus 80

(6) A cache hit occurs upon receiving an ownership delivery request from the shared bus 80 and the owner number line 87 specifies the snoop cache memory module 61

(7) A cache hit occurs upon receiving a consistency maintenance request from the shared bus 80

There are two types of consistency maintenance methods: the invalidation method in which the block in the other snoop cache memory modules are invalidated, and the update method in which the corresponding data in the other snoop cache memory modules are updated. The following explains only the update method although either method may be used for the present invention. Note that, when a cache miss occurs upon receiving a request from the shared bus 80, this system performs no operation. The following explains how each of the above seven categories is performed on the snoop cache memory module 61, one of the snoop cache memory modules.

(1) A cache hit occurs (that is, the desired data is found in the cache memory) upon receiving a read request from the processor 62: The cache control module 18 of the snoop cache memory module 61 reads data, specified by the address register 10, from the cache memory 15 and stores the data in the data register 16. In this case, the ownership is not transferred, nor are the flags changed.

(2) A cache miss occurs (that is, the desired data is not found in the cache memory) upon receiving a read request from the processor 62 The processing of the cache control module 18 is divided into the following two sub-categories:

Block replacement processing

Read data processing

Figure 4:
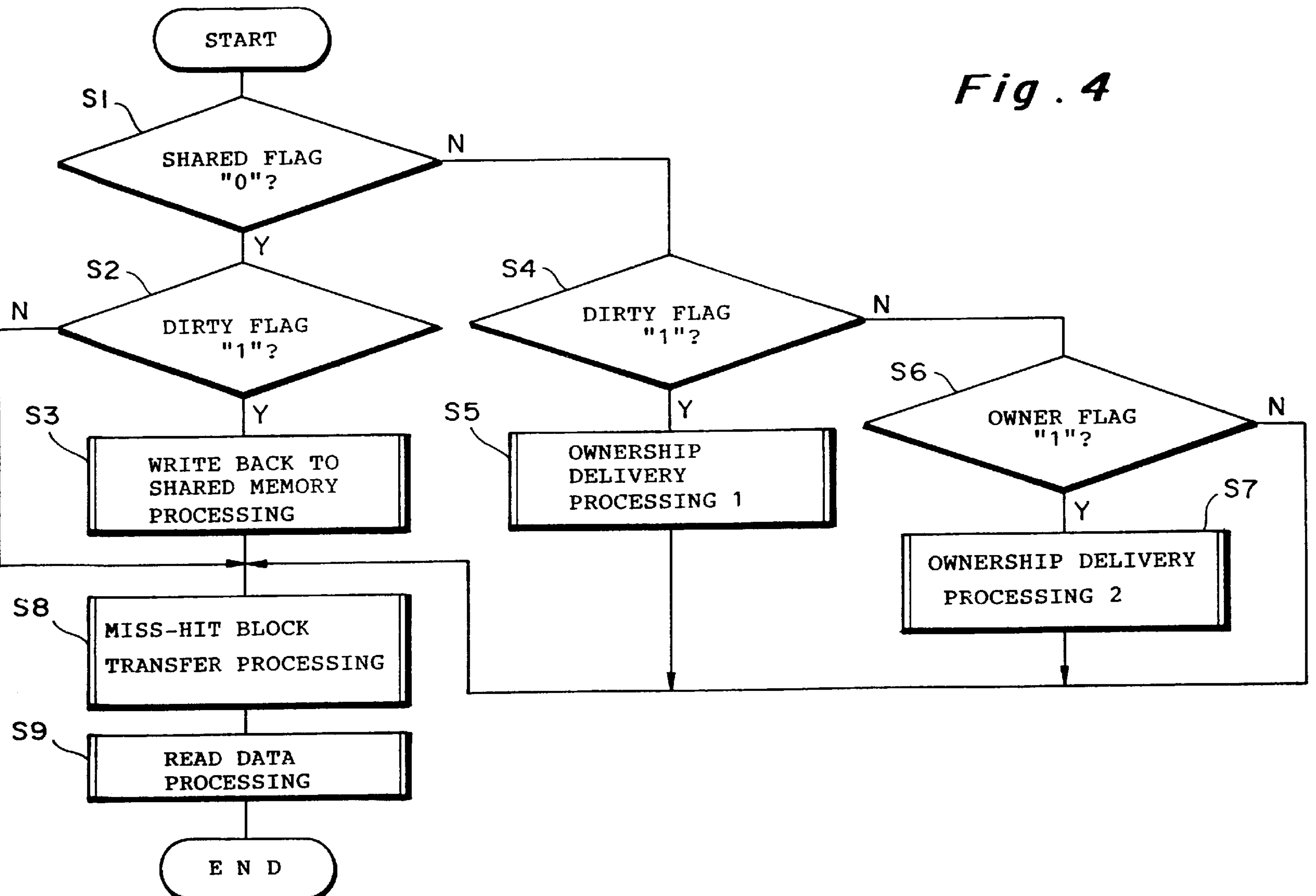
FIG. 4 is a flowchart showing the operation that is performed when a cache miss occurs upon receiving a read request from a processor in the first embodiment of the snoop cache memory control system according to this invention.

The following explains each of these sub-categories:

FIG. 4 is a flowchart showing the processing that is performed when a cache miss occurs when a read request is received from the processor 62.

(a) Block replacement processing:

When the shared flag of the block to be replaced is “0” and the dirty flag of the block is “1”, it is indicated that the snoop cache memory module 61 is responsible for writing the block back to the shared memory 50 because only this snoop cache memory module has the block of data and the module modified it (steps S1, S2, and S3).

Figure 5:
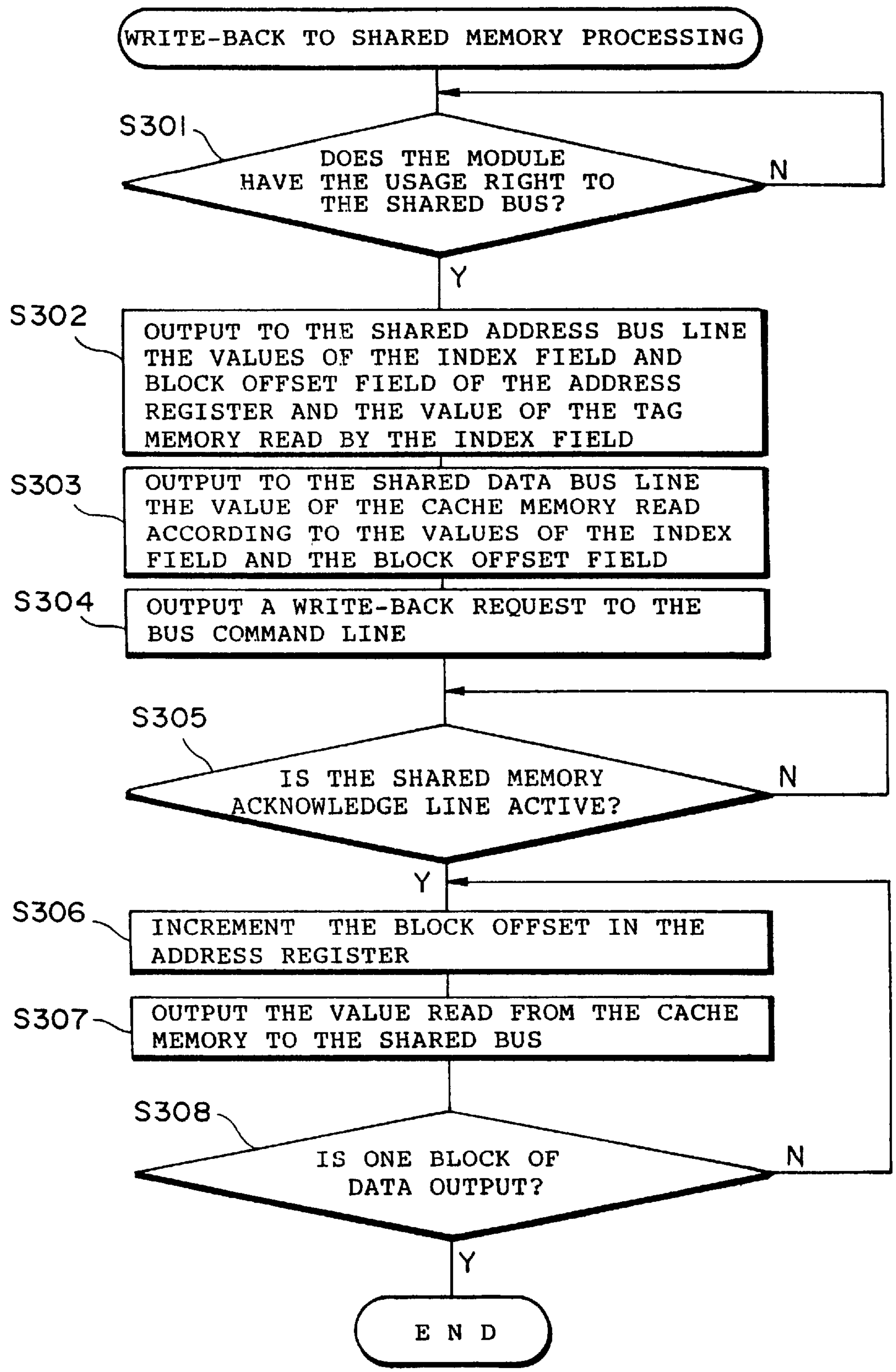
FIG. 5 is a flowchart showing the write-back to shared memory operation in the first embodiment of the snoop cache memory control system according to this invention.

FIG. 5 is a flowchart showing the write-back processing in which data is written back to the shared memory 50. First, the cache control module 18 gets the bus usage right for the shared bus 80 (step S301). After that, the cache control module outputs to the shared address bus line 81 the values of the index field 42 and block offset field 43 of the address stored in the address register 10 and the value of the tag memory 13*a* of the hit determination module 13 that is read by specifying the value of the index field 42 (that is, the memory address of the data). (step S302).

The cache control module outputs to the shared data bus line 82 the data of the cache memory 15 read according to the values of the index field 42 and the block offset field 43 (step S303) and outputs the write-back request to the shared bus command line 83 (step S304). Next, when the shared memory acknowledges that line 84 has become active (step S305), the module increments the block offset field 43 of the address register 10 (step S306), and outputs the data, read from the cache memory 15, to the shared data bus line 82 (step S307). Then, the module checks if one block of data is output to the shared data bus line 82 (step S308). The module repeats this operation to output one block of data. The block offset field 43 is incremented on a wraparound basis.

Referring again to FIG. 4, when the shared flag of the block to be replaced is “1” in step S1 and the dirty flag is “1” in step S4, there is a possibility that the snoop cache memory module with the number indicated by the previous owner number storage module 14*e* has the same copy of data. In this case, the ownership delivery control module 18*c* does not write back the block to the shared memory 50 but attempts to deliver the ownership to the snoop cache memory module indicated by the previous-owner number (ownership delivery processing 1: step S5). If the snoop cache memory module indicated by the previous-owner number does not have a copy of the block, the snoop cache memory module writes back the block to the shared memory 50 as usual.

Figure 6:
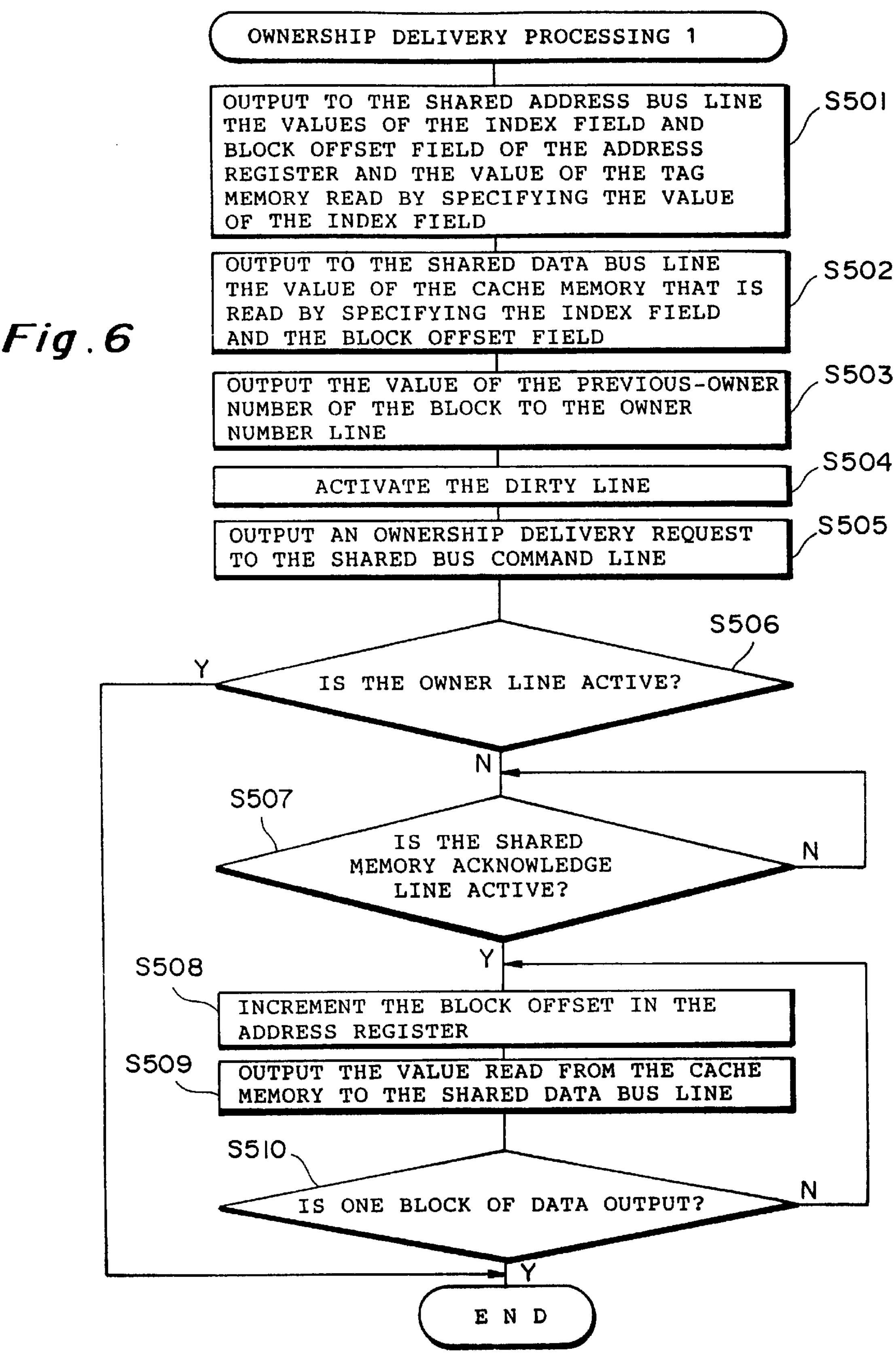
FIG. 6 is a flowchart showing ownership delivery processing 1 in the first embodiment of the snoop cache memory control system according to this invention.

FIG. 6 is a flowchart showing ownership delivery processing 1. First, the ownership delivery control module 18*c* outputs to the shared address bus line 81 the values of the index field 42 and block offset field 43 of the address register 10 as well as the value of the tag memory 13*a* of the hit determination module 13 that is read by specifying the value of the index field 42 (that is, the memory address of the data in the block whose ownership is to be delivered). (step S501). The module outputs to the shared data bus line 82 the value of the cache memory 15 that is read by specifying the index field 42 and the block offset field 43 (step S502). Then, the module outputs the value of the previous-owner number of the block to the owner number line 87 (step S503), activates the dirty line 88 (step S504), and outputs an ownership delivery request to the shared bus command line 83 (step S505).

When the owner line 86 becomes active in step S506, the module completes the ownership delivery processing because the snoop cache memory module indicated by the previous-owner number contains the block. Processing similar to the write-back processing begins in the shared memory 50 when the ownership delivery request is received. However, when the owner line 86 becomes active, the write-back processing stops.

On the other hand, when the owner line 86 does not become active in step S506, the module writes back the block to the shared memory 50 because the snoop cache memory module indicated by the previous-owner number does not contain the block. (steps S507–S510).

Referring again to FIG. 4, when the shared flag of the block to be replaced is “1” in step S1, the dirty flag is “0” in step S4, and the owner flag is “0” in step S6 (that is, the snoop cache memory module is not the owner of the block), it is indicated that either the data is the same as that in the shared memory 50 or some other snoop cache memory module containing the same block of data is responsible for writing data back to the shared memory 50. In this case, the snoop cache memory module 61 does not perform the write-back processing. On the other hand, when the owner flag is “1” in step S6 (that is, the snoop cache memory module is the owner), the ownership delivery control module 18*c* performs ownership delivery processing 2 (step S7).

Figure 7:
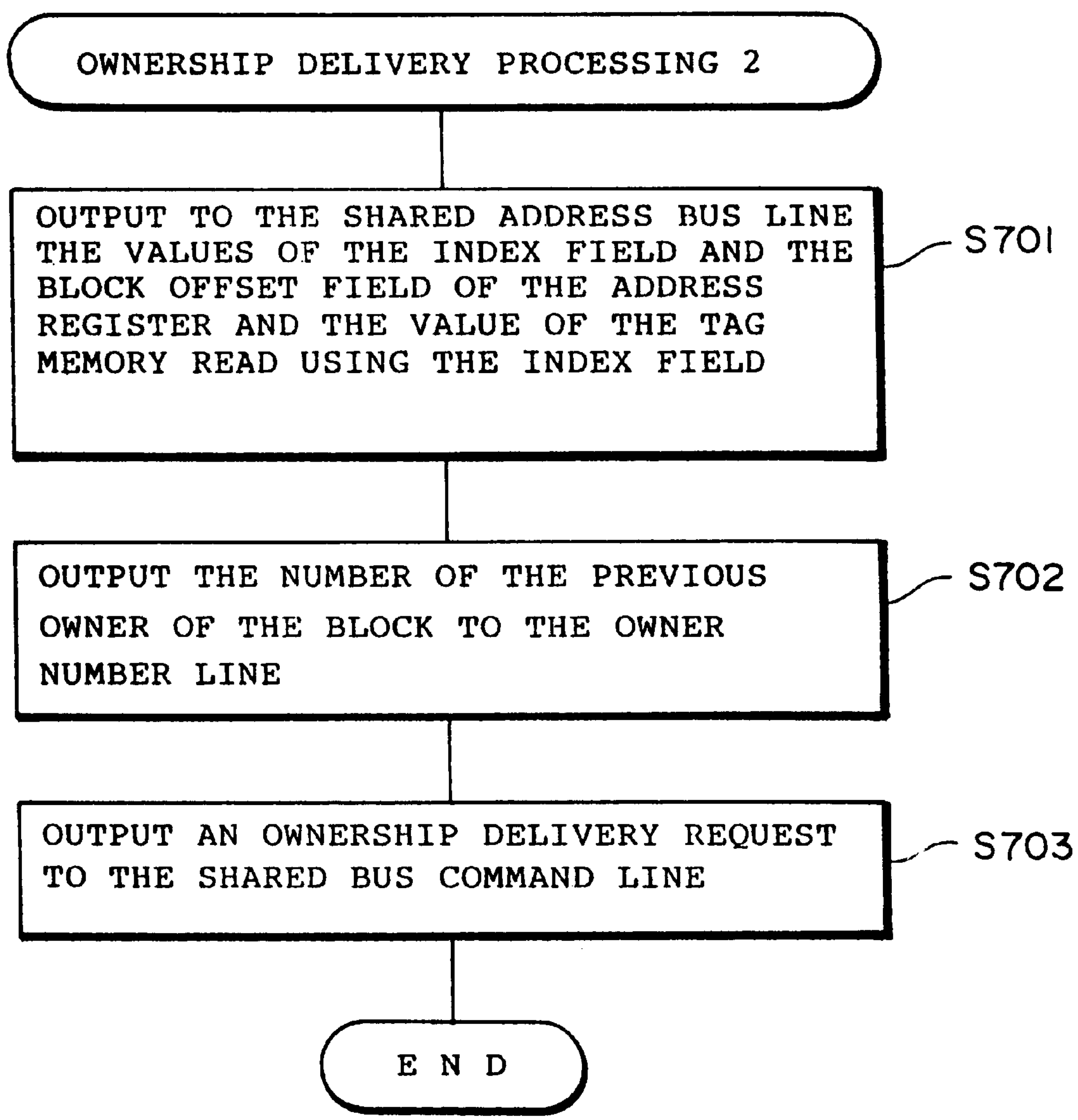
FIG. 7 is a flowchart showing ownership delivery processing 2 in the first embodiment of the snoop cache memory control system according to this invention.

FIG. 7 is a flowchart showing ownership delivery processing 2. The module outputs to the shared address bus line 81 the values of the index field 42 and the block offset field 43 of the address register 10 and the value of the tag memory 13*a* in the hit determination module 13 that is read using the value of the index field 42 (step S701). Next, the module outputs the number of the previous owner to the owner number line 87 (step S702), and then outputs an ownership delivery request to the shared bus command line 83 (step S703). The shared memory 50 checks the dirty line 88 to distinguish the request from this one that is issued when the dirty flag of the block is “1”, (i.e., ownership delivery processing 1) and does not start the same processing as for a write-back request.

Referring again to FIG. 4, when the shared flag of the block to be replaced is “0” in step S1 and the dirty flag is “0” in step S2, it is indicated that the block is not modified and that no other snoop cache memory module contains this block. In this case, the snoop cache memory module performs neither the write back processing nor the ownership delivery processing. When the write-back processing or the ownership delivery processing is terminated, the block transfer control module 18*a* in the cache control module 18 transfers the missed block. (step S8)

Figure 9:
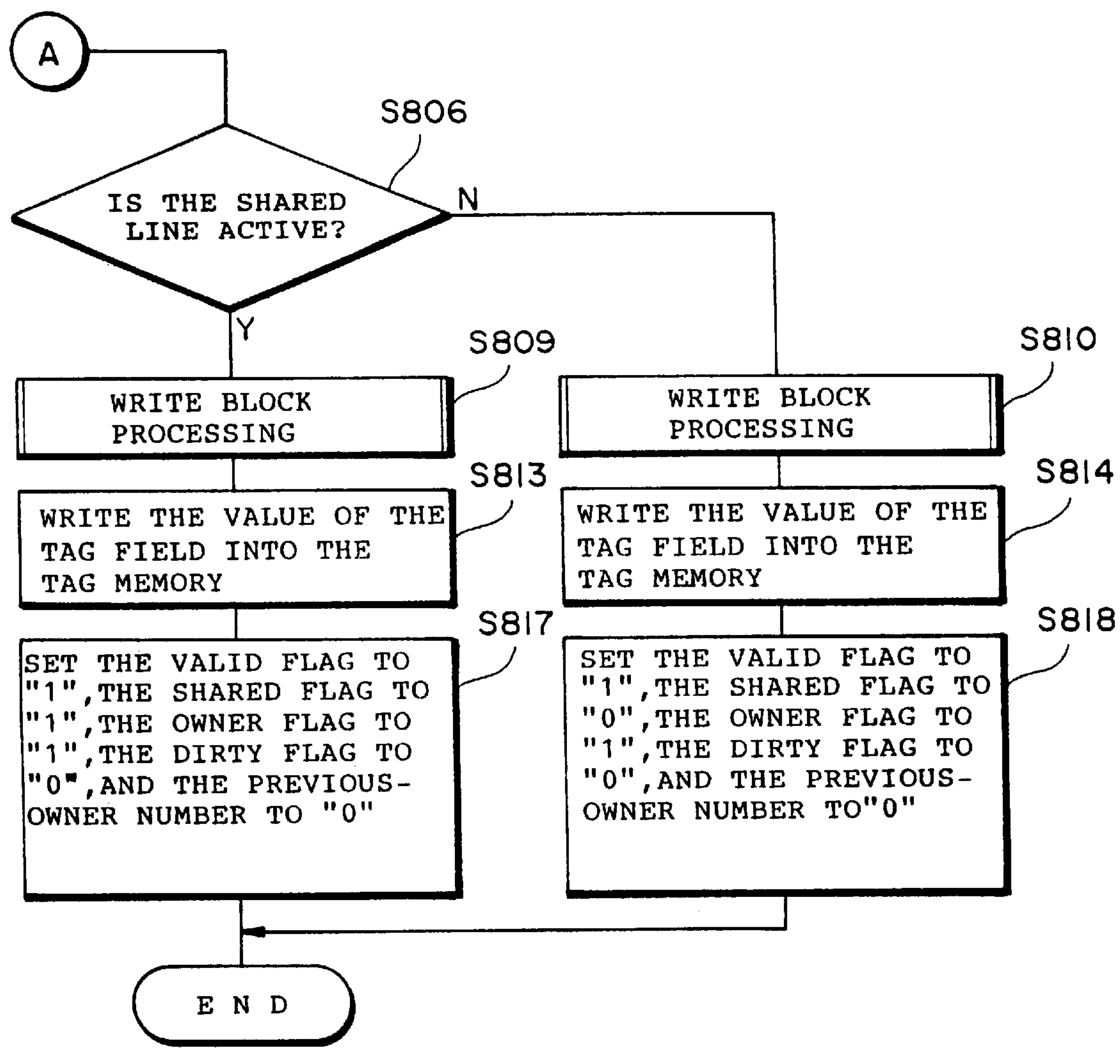
FIG. 9 is a flowchart (2/2) showing the block transfer processing which is performed when a miss hit occurs in the first embodiment of the snoop cache memory control system according to this invention.

FIGS. 8 and 9 are the flowcharts showing the transfer processing of a missed block. The block transfer control module 18*a* outputs the value of the address register 10 to the shared address bus line 81 (step S801), and a block transfer request to the shared bus command line shared bus command line 83 (step S802). When the owner line 86 or the shared memory acknowledge line 84 becomes active, the module writes the value of the shared data bus line 82 to the cache memory 15 (step S803 to step S810).

Figure 10:
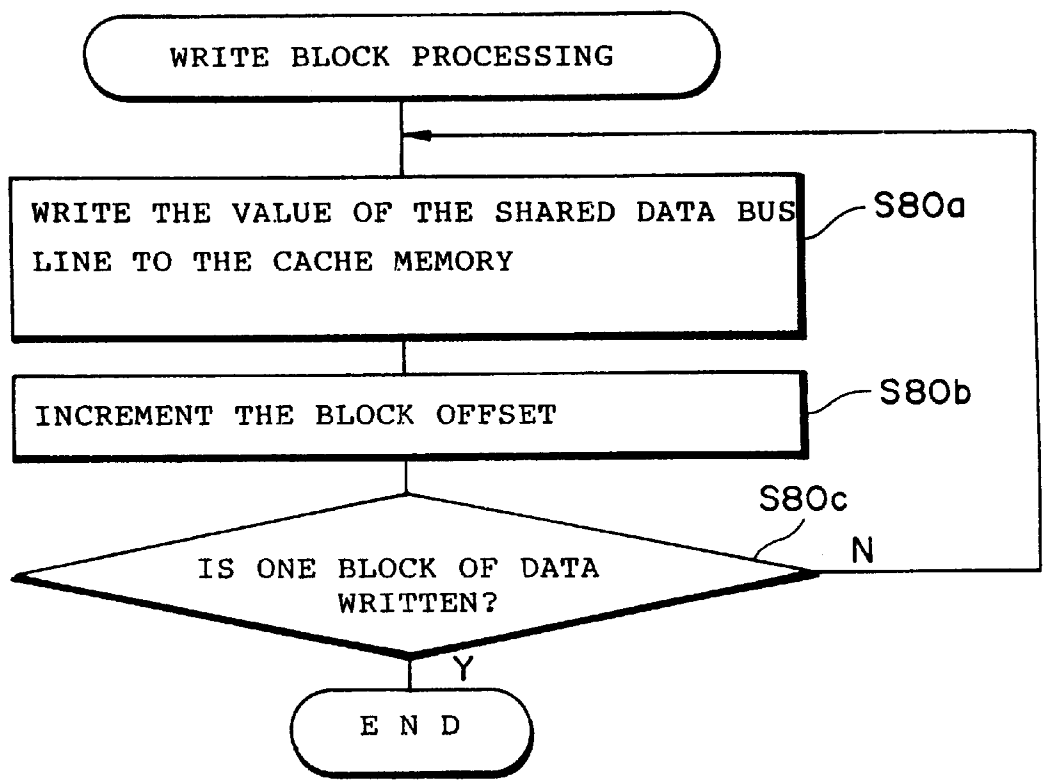
FIG. 10 is a flowchart showing the block write processing in the first embodiment of the snoop cache memory control system according to this invention.

FIG. 10 is a flowchart showing the write block processing. During the write block processing, the block transfer control module 18*a* writes data sent via the shared data bus line 82 to the cache memory cache memory 15; it writes one block of data while incrementing the block offset in each cycle (step S80*a* to step S80*c*).

Referring again to FIGS. 8 and 9, when the block transfer control module 18*a* writes the last data, it writes the value of the tag field 41 of missed data into the area in the tag memory 13*a* indicated by the index field 42 of the address register 10 (steps S811, S812, S813, and S814). At the same time, the module writes the status into the area indicated by the index field 42 of the address register 10 (steps S815, S816, S817, and S818).

The status values are as follows. When the owner line 86 is active and the dirty line 88 is active, it is indicated that the block was transferred from some other snoop cache memory module and that the block as modified. In this case, the block transfer control module sets the valid flag to "1", the shared flag to "1", the owner flag to "1", the dirty flag to "1", and the previous-owner number to the value of the owner number line 87 (step S815) to transfer the ownership. That is, the module transfers the ownership from the source snoop cache memory module to this snoop cache memory module 61. Thus, the complete sequence of steps is S803, S805, S807, S811 and S815. When the dirty line 88 is not active at this time (step S805), it is indicated that the block is not modified. In this case, the module sets the dirty flag to "0" (step S816). Thus the complete sequence of steps is S803, S805, S808, S812, and S816.

When the shared memory acknowledge line 84 is active (step S804) and the shared line 85 is active (step 806), it is indicated that the block was transferred from the shared memory 50 and that there is some other snoop cache memory module containing the block. In this case, the block transfer control module 18*a* sets the valid flag to "1", the shared flag to "1", the owner flag to "1", the dirty flag to "0", and the previous-owner number to "0"which indicates the shared memory 50 (step S817). Thus the complete sequence of steps is S803, S804, S806, S809, S813, and S817.

On the other hand, when the shared memory acknowledge line 84 is active (step S804) and the shared line 85 is inactive (step S806), it is indicated that the block was transferred from the shared memory 50 and that there is no other snoop cache memory module containing the block. In this case, the block transfer control module 18*a* sets the valid flag to "1", the shared flag to "0", the owner flag to "1", the dirty flag to "0", and the previous-owner number to "0" (step S818). Thus the complete sequence of steps is S803, S804, S806, S810, S814, and S818.

As described above, when a cache miss occurs upon receiving a request from the processor 62, the snoop cache memory module 61 always becomes the owner of the block containing the data.

Figure 11:
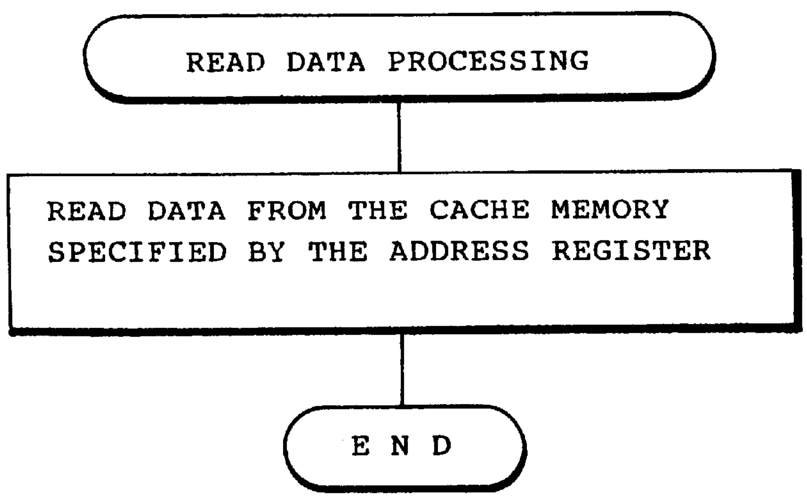
FIG. 11 is a flowchart showing the block read processing in the first embodiment of the snoop cache memory control system according to this invention.

(b) Read data processing:

FIG. 11 is a flowchart showing the read data processing (step S9 in FIG. 4). During the read data processing, the cache control module 18 reads data from the cache memory 15 specified by the address register 10 and sets it in the data register 16.

Figure 12:
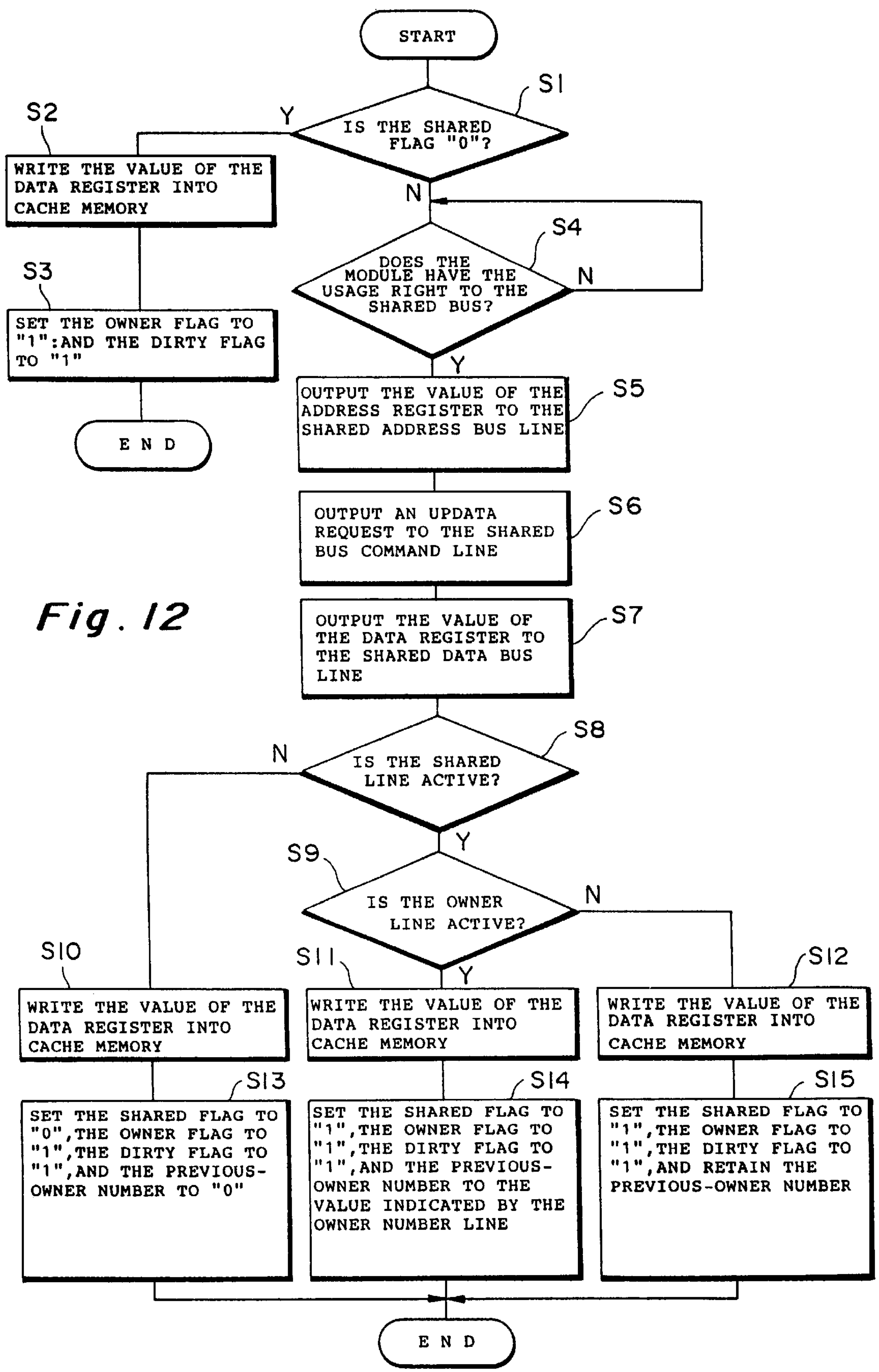
FIG. 12 is a flowchart showing the processing that is performed when a cache hit occurs upon receiving a write request from a processor in the first embodiment of the snoop cache memory control system according to this invention.

(3) A cache hit occurs upon receiving a write request from the processor 62:

FIG. 12 is a flowchart showing the processing that is performed when a cache hit occurs upon receiving a write request from the processor 62. In step S1, when the shared flag of the block is "0", the snoop cache memory module 61 performs write data processing locally. First, the cache control module 18 writes the value of the data register 16 into the cache memory 15 specified by the index field 42 and the block offset field 43 of the address register 10 (step S2). At the same time, the cache control module 18 sets the owner flag to "1" and the dirty flag to "1" in the status memory 14 specified by the index field 42 of the address register 10 (step S3).

On the other hand, when the shared flag is "1" in step S1, the update control module 18*b,* one of the components of the cache control module 18, issues an update request to other snoop cache memory modules having the same block. This processing is performed as follows. First, the module gets the bus usage right to the shared bus 80 (step S4). After that, the module outputs the value of the address register 10 to the shared address bus line 81 (step S5) and, at the same time, the update request to the shared bus command line 83 (step S6). In the next cycle, the module outputs the value of the data register 16 to the shared data bus line 82 (step S7), and performs write data processing as in above steps S2 and S3 (step S8 to step S15).

In steps S8 to S15, the module writes the following status data into the status memory 14. For example, when the shared line 85 is active and the owner line 86 is active, it is indicated some other snoop cache memory module is the owner of the block. In this case, the update control module 18*b* sets the shared flag to "1", the owner flag to "1", the dirty flag to "1", and the previous-owner number to the value of the owner number line 87 to transfer the ownership (steps S8, S9, S11 and S14). That is, this snoop cache memory module 61 becomes the new owner.

When the shared line 85 is active and the owner line 86 is inactive, it is indicated that the other snoop cache memory module containing the block is not the owner of the block. The update control module 18*b* sets the shared flag to "1", the owner flag to "1", and the dirty flag to "1" and retains the value of the previous-owner number (steps S8, S9, S11 and S14).

When the shared line 85 is inactive, it is indicated that there is no other snoop cache memory module containing the block. In this case, the update control module 18*b* sets the shared flag to "0", the owner flag to "1", the dirty flag to "1", and the previous-owner number to "0" (step S8, S10 and S13).

Thus, when a cache hit occurs when a write request is received from the processor 62, this snoop cache memory module 61 becomes the owner of the block.

(4) A cache miss occurs upon receiving a write request from the processor:

In this case, the snoop cache memory module performs the same processing as the block replacement processing executed when a cache miss occurs upon receiving a read request from the processor as described above. Therefore, this snoop cache memory module 61 becomes the owner of the block.

(5) A cache hit occurs upon receiving a block transfer request from the shared bus:

FIG. 13 is a flowchart showing the processing that is performed when a cache hit occurs when a block transfer request is received from the shared bus 80.

In step S1, when the owner flag 14*c* in the status memory 14 corresponding to the value of index field 42 stored in the shared address register 11 is "1", this snoop cache memory module 61 becomes the block transfer source. The block transfer control module 18*a* of this snoop cache memory module 61 first activates the owner line 86 and the shared line 85 (step S2) and outputs the number of this snoop cache memory module 61 to the owner number line 87 (step S5). In addition, the module outputs to the shared data bus line 82 the value of the index field 42 stored in the shared address register 11 and the data in the cache memory 15 that is read by specifying the value of the block offset field 43 (step S6). At this time, when the dirty flag is "1", the dirty line 88 also becomes active (steps S3 and S4). In addition, the module outputs one block of data while incrementing the block offset field 43 for each cycle (steps S7, S8). When the module outputs the last data, it changes the contents of the status memory 14 corresponding to the index field 42 stored in the shared address register 11 as follows: that is, it sets the shared flag to "1", the owner flag to "0", the dirty flag to "0" (step S9), and transfers the ownership to the snoop cache memory module of the transfer request source (=block transfer destination). That is, the above operation corresponds to the operation of the snoop cache memory module of the block transfer source described above in (2).

On the other hand, when the owner flag is "0", the block transfer control module 18*a* activates the shared line 85 to indicate that the snoop cache memory module of the transfer request source contains the block. In this case, the module does not transfer the block (step S10).

(6) A cache hit occurs upon receiving an ownership delivery request from the shared bus 80 and the owner number line 87 specifies the snoop cache memory module 61:

In this case, the snoop cache memory module performs the operation that is performed when an ownership is delivered as explained in the description of ownership delivery processing 1 and 2.

Figure 14:
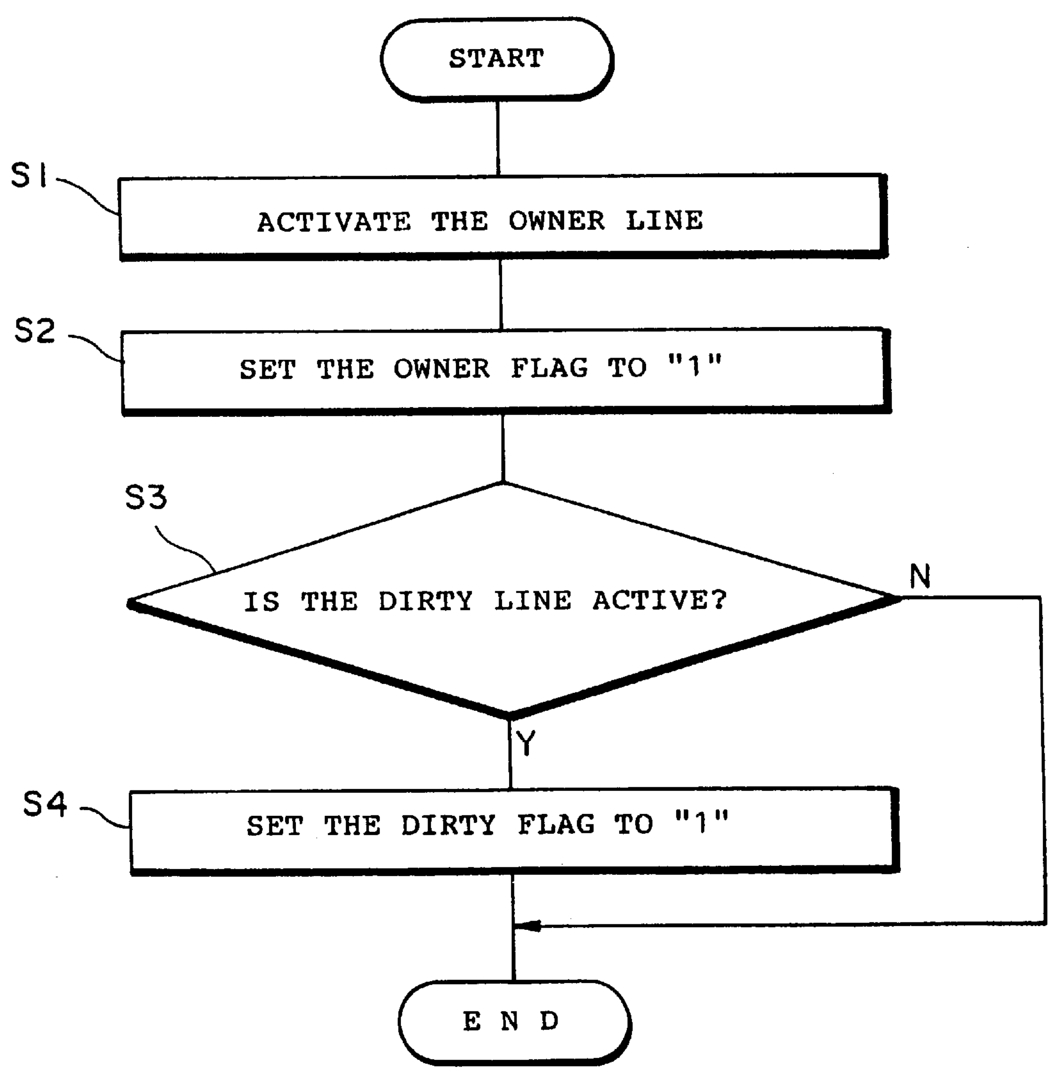
FIG. 14 is a flowchart showing the processing that is performed when a cache hit occurs upon receiving an owner delivery request from the shared bus and the owner number is the number of the current cache memory in the first embodiment of the snoop cache memory control system according to this invention.

FIG. 14 is a flowchart showing the processing that is performed in this case. The ownership delivery control module 18*c* first activates the owner line 86 (step S1). The module sets the owner flag 14*c* in the status memory 14 corresponding to the value in the index field 42 stored in the shared address register 11 (step S2) to become the owner of the block. When the dirty line 88 is active, the module also sets the dirty flag to "1" (steps S3, S4).

(7) A cache hit occurs upon receiving an update request from the shared bus 80:

In this case, the snoop cache memory module performs the operation that is performed when an update request is sent during operation of (3) and (4) described above.

Figure 15:
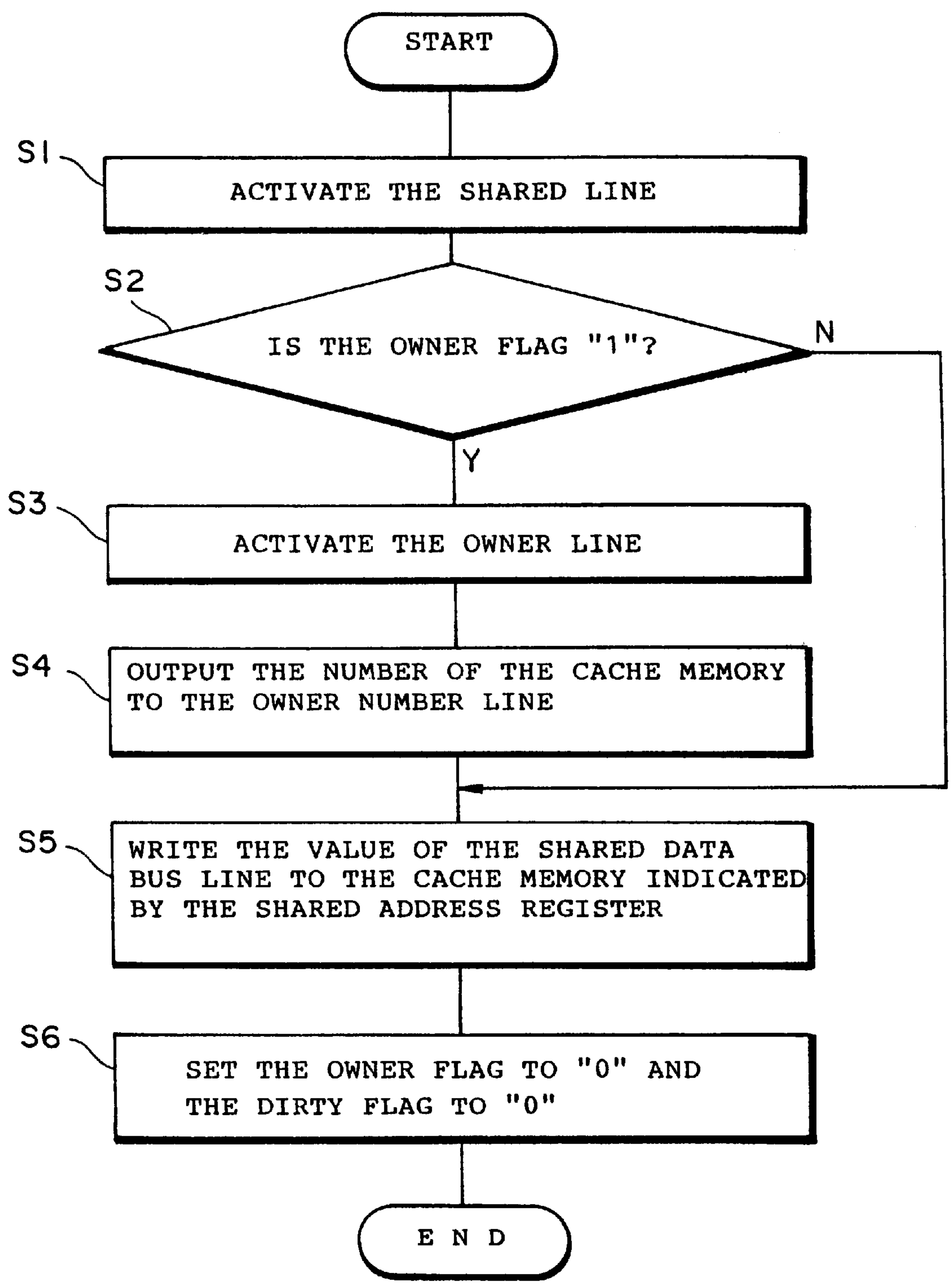
FIG. 15 is a flowchart showing the processing that is performed when a cache hit occurs upon receiving an update request from the shared bus in the first embodiment of the snoop cache memory control system according to this invention.

FIG. 15 is a flowchart showing this operation.

The update control module 18*b* of the snoop cache memory module 61 in which a cache hit has occurred activates the shared line 85 (step S1). Then, when the owner flag 14*c* in the status memory 14 corresponding to the index field 42 stored in the shared address register 11 is "1", the module also activates the owner line 86 (steps S2, S3) and outputs the number of the snoop cache memory module 61 to the owner number line 87 (step S4). The update control module 18*b* writes the value of the shared data bus line 82 into the area in the cache memory 15 indicated by the index field 42 of the shared address register 11 (step S5). In addition, the module sets to "0" the owner flag 14*c* in the status memory 14 corresponding to the index field 42, and the dirty flag 14*d* to "0". In step S2, when the owner flag is "0", control is passed to step S5.

The snoop cache memory module explained in the first embodiment has the owner flag 14*c* in the status memory 14 to store the number of the snoop cache memory module which was the previous owner of data. When the ownership is transferred, for example, when a block is transferred between cache memories or data in a shared block is updated, the module uses the owner number line 87 on the shared bus 80 to store the number of the previous-owner snoop cache memory module. Therefore, even if the write-back to the shared memory 50 is necessary when a cache miss occurs, this method allows the ownership to be transferred to the snoop cache memory module whose number is stored, thus reducing the number of times data must be written back.

Delivery of the ownership makes it possible for an owner block to stay in the snoop cache memory module longer. This increases the probability that, when a cache miss occurs, the block is transferred, not from the shared memory 50, but from some other snoop cache memory module. That is, when a cache miss occurs, the reduced number of times to access the shared memory 50 ensures better responsiveness, reduced use of the shared bus 80, and increased throughput.

Second Embodiment

The snoop cache memory module control system used in the second embodiment has an ownership delivery priority assigned to each of the snoop cache memory modules. That is, in this embodiment, each snoop cache memory module has its own priority information. Upon receiving an ownership delivery request from the owner, the high-priority cache memory hit determination module checks if a higher priority snoop cache memory module has the block of data with the same address. More specifically, each snoop cache memory module monitors the shared line of all the snoop cache memory modules. And, if the shared line of any higher priority snoop cache memory module is not active, the snoop cache memory module determines that this snoop cache memory module has the highest priority. When this snoop cache memory module is the owner of a block and it is going to expel it, the ownership delivery control module sends an ownership delivery request to all the other snoop cache memory modules. On the other hand, when the snoop cache memory module receives an ownership delivery request for a block for which this snoop cache memory module is not the owner and when the high-priority cache memory hit determination module determines that there is no other snoop cache memory module having a higher priority, the snoop cache memory module becomes the owner of the block.

Therefore, as long as a block of data is in one or more of the snoop cache memory modules, it can be said that one of the snoop cache memory modules is the owner of the block. So, as long as the block is in one of the snoop cache memory modules when a cache miss occurs, the block is transferred, not between a snoop cache memory module and the shared memory, but between snoop cache memory modules, significantly reducing the number of times access must be made to the shared memory. Another advantage of this system is that a modified block is written back to the shared memory only when the last copy of the block is expelled. This also reduces the number of times access must be made to the shared memory.

Figure 16:
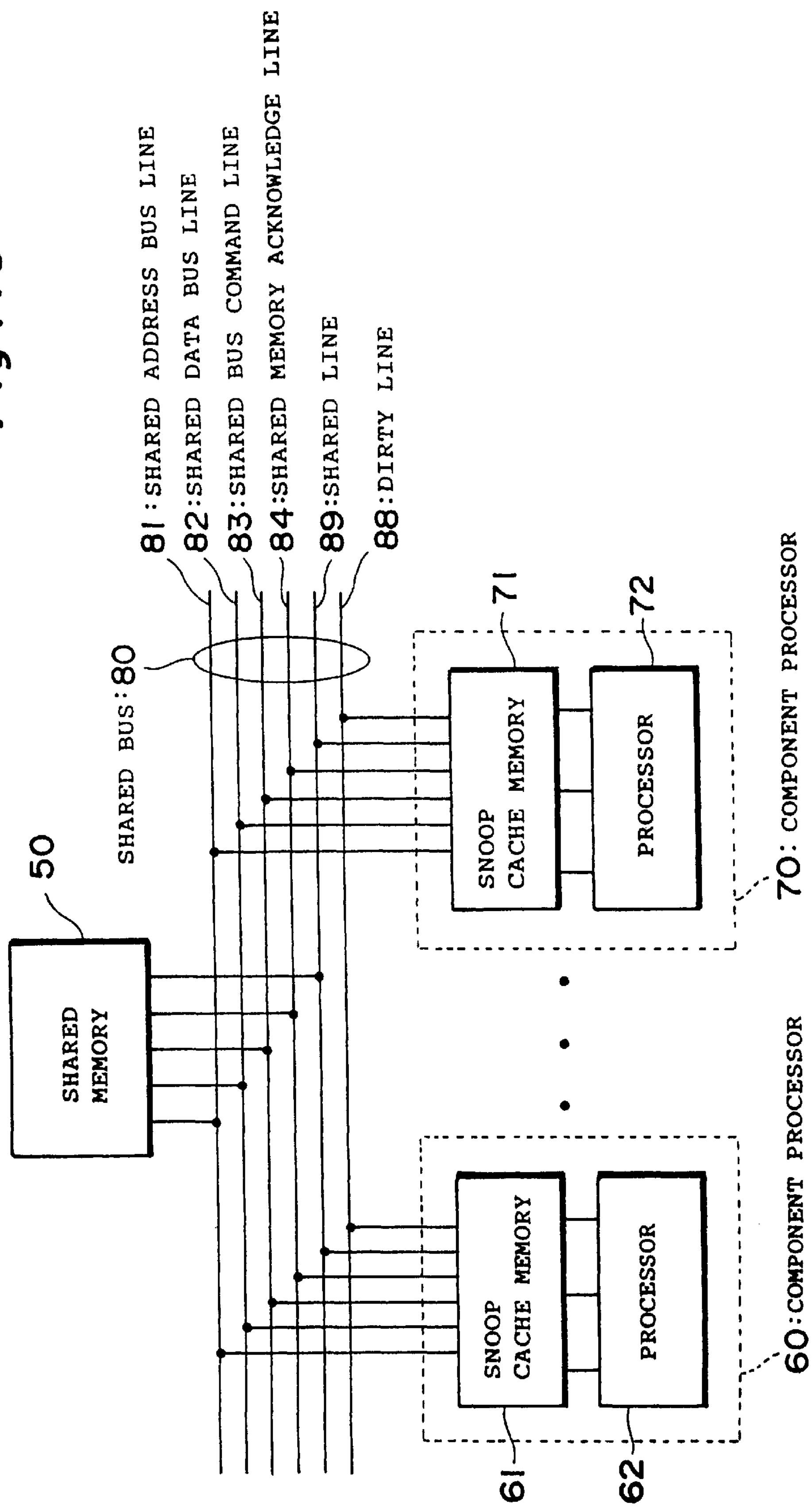
FIG. 16 is a configuration diagram showing the shared-bus multiprocessor system implemented by the snoop cache memory control system according to the second embodiment of this invention.

FIG. 16 is a configuration diagram of the common bus multiprocessor system used with the snoop cache memory control system of the second embodiment.

As with the first embodiment, the system shown in the figure has the shared memory 50 and a plurality of component processors 60–70. Each of the component processors 60 to 70 has a snoop cache memory module and a processor; for example, the component processor 60 has the snoop cache memory module 61 and the processor 62. The snoop cache memory modules 61–71 each are connected to the shared memory 50 via the shared bus 80.

The shared bus 80 consists of six lines: the shared address bus line 81 through which a common address is transferred to the shared memory 50 and to each of snoop cache memory modules 61 to 71, the shared data bus line 82 through which data is transferred, the shared bus command line 83 through which a request such as a read block request or update request is transferred, the shared memory acknowledge line 84 through which a timing signal used to write or read a cache block to or from the shared memory 50 is sent, the shared line 89 indicating that the block is shared with other snoop cache memory modules in response to a block transfer request upon occurrence of a cache miss, to an ownership delivery request during replacement processing that is performed upon occurrence of a cache miss, or to an update request to the shared block, and the dirty line 88 indicating that, when a block is transferred from some other cache memory upon occurrence of a cache miss, the block has been modified. As shown in the figure, the shared bus connects the shared memory 50 and each of snoop cache memory modules 61 and 71.

The shared line 89 is provided for each of the component processors 60 to 70, the output from each of component processors 60 to 70 being output to the corresponding shared line 89. The snoop cache memory modules 61 to 71 use the logical OR of the values from all the shared lines 89 or, with priorities assigned to component processors 60 to 70, the logical OR of the values from the shared lines 89 of the higher-priority component processors 60 to 70.

The description of the address configuration of this embodiment is omitted because the configuration is the same as that in the first embodiment in FIG. 3.

Figure 17:
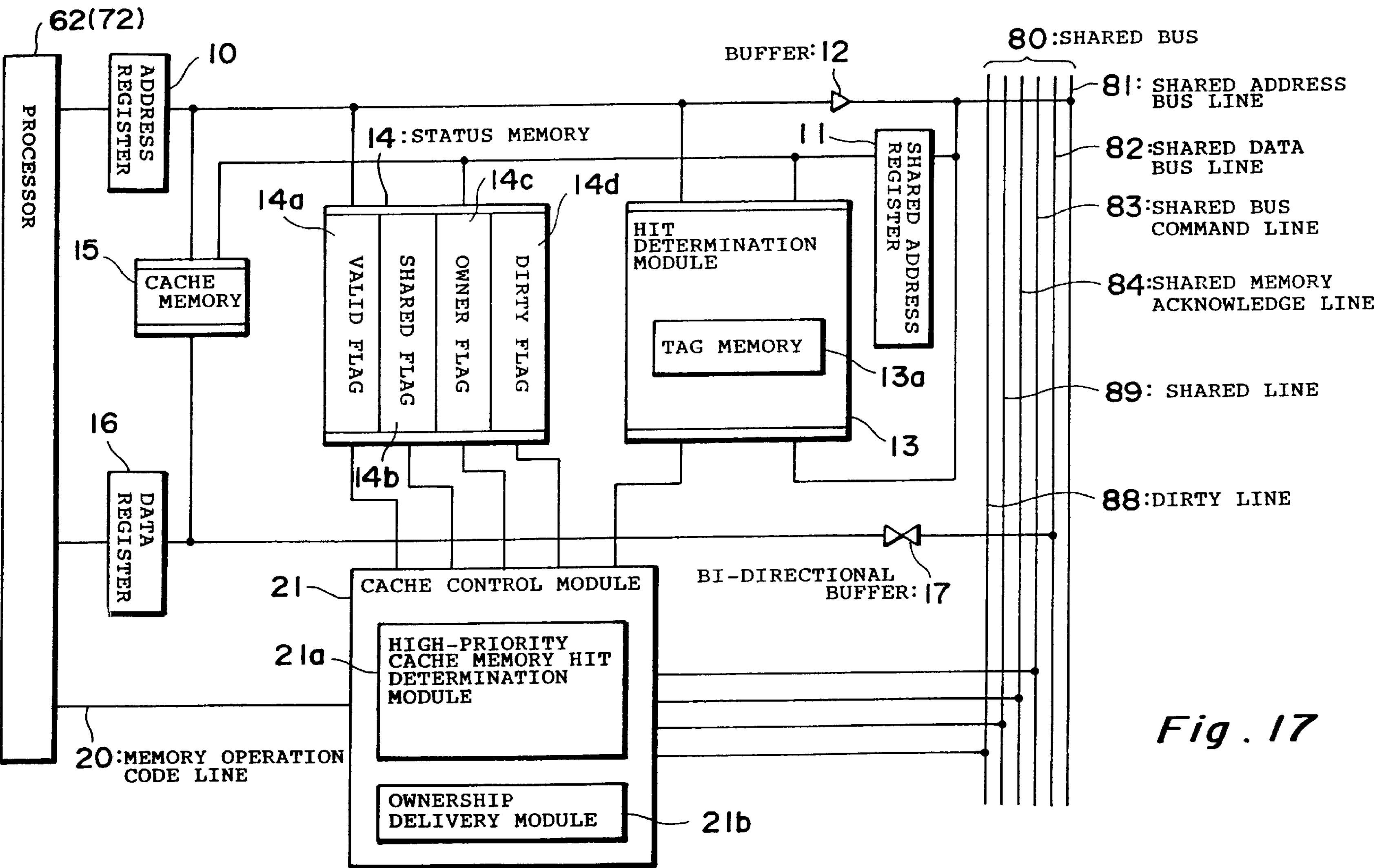
FIG. 17 is a configuration diagram showing the second embodiment of the snoop cache memory control system according to the second embodiment.

The following explains the snoop cache memory control system in the second embodiment. FIG. 17 is a configuration diagram of the snoop cache memory control system in the second embodiment. The system shown in the figure comprises: the address register 10, shared address register 11, buffer 12, hit determination module 13, status memory 14, cache memory 15, data register 16, bi-directional buffer 17, and cache control module 21. The status memory 14 contains the valid flag 14*a*, shared flag 14*b*, owner flag 14*c*, and dirty flag 14*d*, the meanings of these flags being the same as those of the status memory in the first embodiment. The configurations of the address register 10, the hit determination module 13, the cache memory 15, and the bi-directional buffer 17 are not explained here because they are the same as those in the first embodiment.

The memory operation code line 20 and the shared bus command line 83 through the shared line 89 are connected to the cache control module 21. The shared data bus line 82 is connected through the bidirectional buffer 17 to the cache memory 15 and the data register 16. The shared address bus line 81 is connected through the buffer 12 to the address register 10 and to the shared address register 11 and the hit determination module 13.

The cache control module 21 contains the high-priority cache memory hit determination module 21*a* and the ownership delivery control module 21*b*. If, upon receiving an ownership delivery request, there are a plurality of snoop cache memory modules, each with its own priority, in which a cache hit has occurred, the high-priority cache memory hit determination module 21*a* checks if a cache hit has occurred in one of the higher-priority snoop cache memory modules.

Each snoop cache memory module has its own priority, with a snoop cache memory module with a larger number having a higher priority. And, the high-priority cache memory hit determination module checks if a cache hit has occurred in a higher-priority snoop cache memory module; for example, the high-priority cache memory hit determination module 21*a* of the snoop cache memory module with the priority number of 1 finds the logical OR of the shared lines 89 of the snoop cache memory modules with the priority number of 2 or larger, and the high-priority cache memory hit determination module 21*a* of the snoop cache memory module with the priority number of 2 finds the logical OR of the shared lines 89 of the snoop cache memory modules with the priority number of 3 or larger. Notice that the priority assignment is not limited to the above method but any other method, if any, may be used.

When the replacement processing is executed because of a miss hit of a shared block and when this snoop cache memory module is the owner of the block, the ownership delivery control module 21*b* outputs an ownership delivery request to the shared bus 80. When the snoop cache memory module receives an ownership delivery request and when it contains the block, the ownership delivery control module 21*b* informs all the snoop cache memory modules that it has the block. When the high-priority cache memory hit determination module 21*a* finds that no higher-priority snoop cache memory module contains the block, the ownership delivery control module 21*b* assigns the ownership to this snoop cache memory module. On the other hand, when the snoop cache memory module issues an ownership delivery request but there is no other snoop cache memory module containing the block and when the block is modified, the ownership delivery control module 21*b* writes back the block to the shared memory 50.

A read data request or a write-back request from the processor 62 is sent to the cache control module 21 through the memory operation code line 20. A request, such as a block transfer request or a data update request, is transferred between the cache control module 21 and other snoop cache memory modules on the shared bus 80 or the shared memory 50 through the shared bus command line 83.

The address register 10 or the shared address register 11 contains an address used for writing data to, or reading data from, the tag memory 13*a* of the hit determination module 13 or the status memory 14. The index field 42 and the block offset field 43 of the address register 10 or the shared address register 11 contain an address for writing data to, or reading data from, the cache memory 15.

As with the first embodiment, control is passed first to the hit determination module of the snoop cache memory module in the second embodiment. The subsequent processing, divided into the seven categories listed below, depends upon the result of the hit determination module or on a request sent from the processor 62 or the shared bus 80:

(1) A cache hit occurs upon receiving a read request from the processor.

(2) A cache miss occurs upon receiving a read request from the processor.

(3) A cache hit occurs upon receiving a write request from the processor.

(4) A cache miss occurs upon receiving a write request from the processor.

(5) A cache hit occurs upon receiving a block transfer request from the shared bus 80.

(6) A cache hit occurs upon receiving an ownership delivery request from the shared bus 80.

(7) A cache hit occurs upon receiving an update request from the shared bus 80.

Note that, when a cache miss occurs upon receiving a request from the 80, this system performs no operation. The following explains each of the above seven categories:

(1) A cache hit occurs upon receiving a read request from the processor 62:

The cache control module 18 of the snoop cache memory module 61 reads data, specified by the address register 10, from the cache memory 15 and stores the data in the data register 16. In this case, the ownership is not transferred, nor are the flags changed.

(2) A cache miss occurs upon receiving a read request from the processor 62:

The processing of the snoop cache memory module 61 is divided into the following two sub-categories:

Block replacement processing

Read data processing

The following explains each of these sub-categories:

The flowchart shown in FIG. 4 is used also for the processing that is performed when a cache miss occurs upon receiving a read request from the processor 62 in the second embodiment. The system in the second embodiment will be described with reference to FIG. 4.

(a) Block replacement processing:

When the shared flag of the block to be replaced is "0" and the dirty flag of the block is "1", it is indicated that the snoop cache memory module is responsible for writing the block back to the shared memory 50 because only this snoop cache memory module has the block of data and the module modified it (steps S1, S2, and S3). The write-back processing is not described here because it is the same as that shown in FIG. 5.

Referring again to FIG. 4, when the shared flag of the block to be replaced is "1" and the dirty flag is "1" (steps S1 and S4), there is a possibility that some other snoop cache memory modules have the same copy of data. In this case, the ownership delivery control module 21*b* does not write back the module to the shared memory 50 but attempts to deliver the ownership to some other snoop cache memory module (ownership delivery processing 1: step S5). If some other snoop cache memory module does not have a copy of the block, the snoop cache memory module writes back the block to the shared memory 50 as usual.

Figure 18:
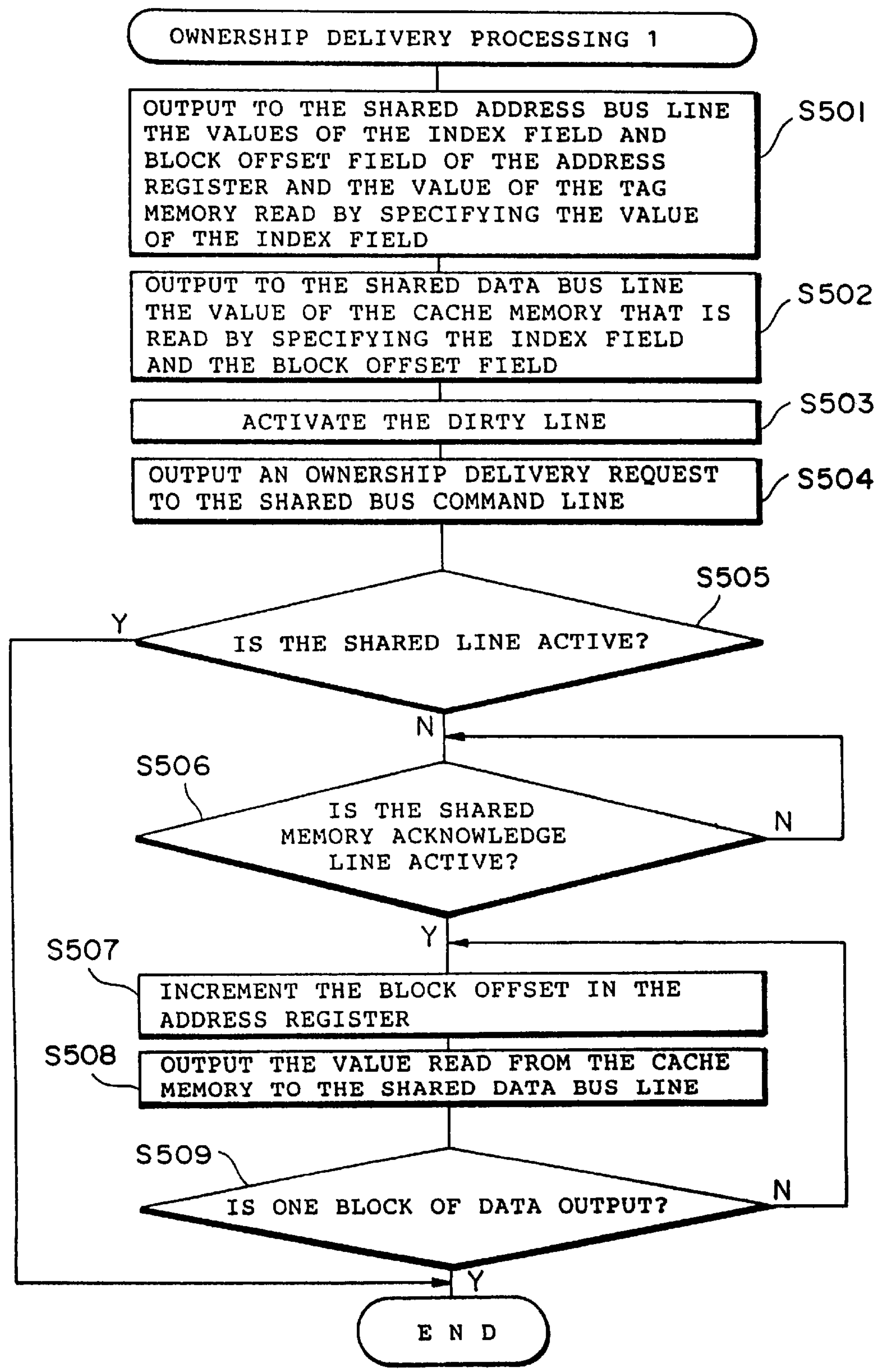
FIG. 18 is a flowchart showing ownership delivery processing 1 in the second embodiment of the snoop cache memory control system according to this invention.

FIG. 18 is a flowchart showing the processing of ownership delivery processing 1 of the second embodiment. First, the ownership delivery control module outputs to the shared address bus line 81 the values of the index field 42 and the block offset field 43 of the address register 10 as well as the value of the tag memory 13*a* of the hit determination module 13 that is read by the index field 42 (step S501). In addition, the module outputs to the shared data bus line 82 the value of the cache memory 15 that is read by the index field 42 and the block offset field 43 (step S502), activates the dirty line 88 (step S503), and outputs an ownership delivery request to the shared bus command line 83 (step S504).

If the shared line 89 is active in step S505, the ownership delivery processing is completed because it is indicated that some other snoop cache memory module has the block. Processing similar to the write-back processing begins in the shared memory 50 when the ownership delivery request is received. However, when the shared line 89 becomes active, the write-back processing stops.

On the other hand, if the shared line 89 does not become active in step S505, it is indicated that some other snoop cache memory module does not have a copy of the block. In this case, the block is written back to the shared memory 50 (steps S506 to S509).

Referring again to FIG. 4, when the shared flag of the block to be replaced is "1", the dirty flag is "0", and the owner flag is "0", it is indicated that either the data is the same as that in the shared memory 50 or some other snoop cache memory module containing the same block of data is responsible for writing the data back to the shared memory 50. In this case, the snoop cache memory module does not perform the write-back processing (steps S1, S4 and S6). On the other hand, when the owner flag is "1" in step S6, the ownership delivery control module 21*b* performs ownership delivery processing 2 (step S7).

Figure 19:
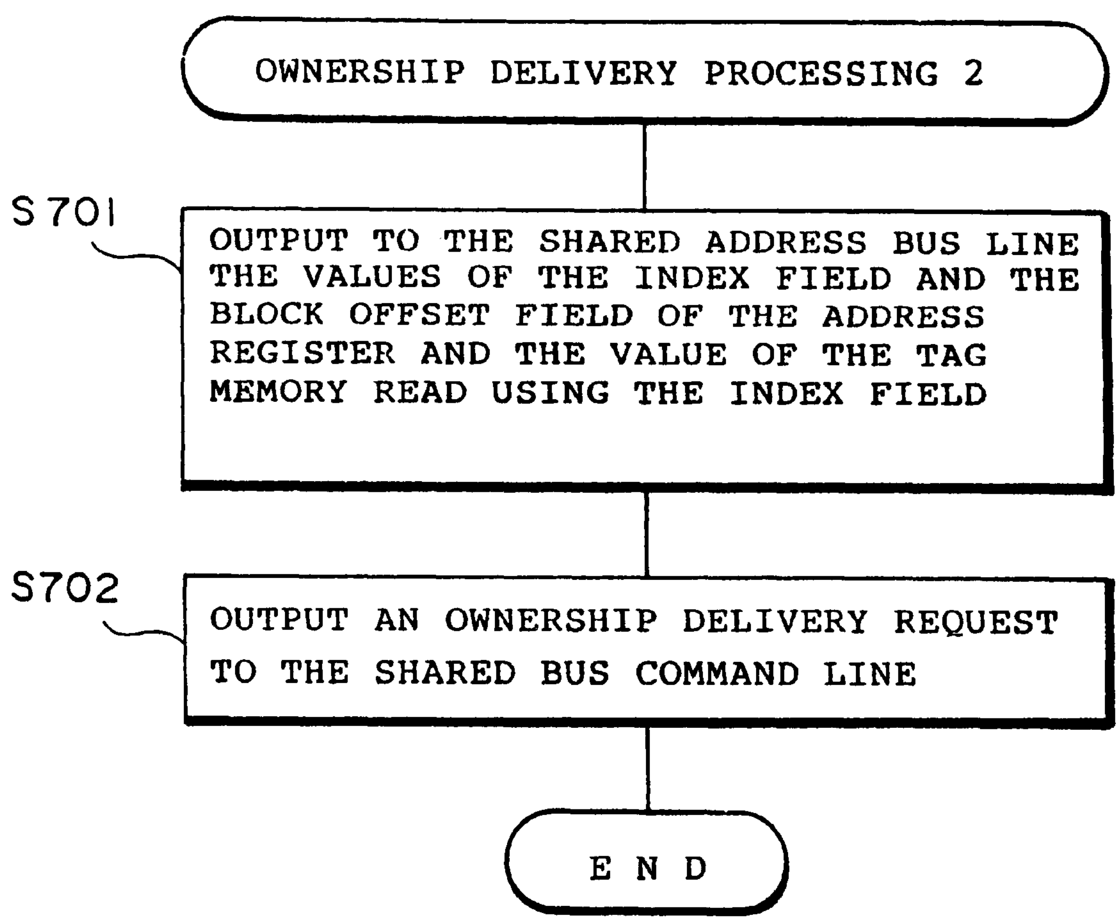
FIG. 19 is a flowchart showing ownership delivery processing 2 in the second embodiment of the snoop cache memory control system according to this invention.

FIG. 19 is a flowchart showing the processing of ownership delivery processing 2. The module outputs to the shared address bus line 81 the values of the index field 42 and the block offset field 43 of the address register 10 and the value of the tag memory 13*a* in the hit determination module 13 that is read using the value of the index field 42 (step S701). Next, the module outputs an ownership delivery request to the shared bus command line 83 (step S702). The shared memory 50 checks the dirty line 88 to distinguish the request from the one that is issued when the dirty flag of the block is "1", and does not start the same processing as for a write-back request.

In FIG. 4 again, when write-back processing or ownership delivery processing is terminated, the missed block is transferred (step S8).

Figure 20:
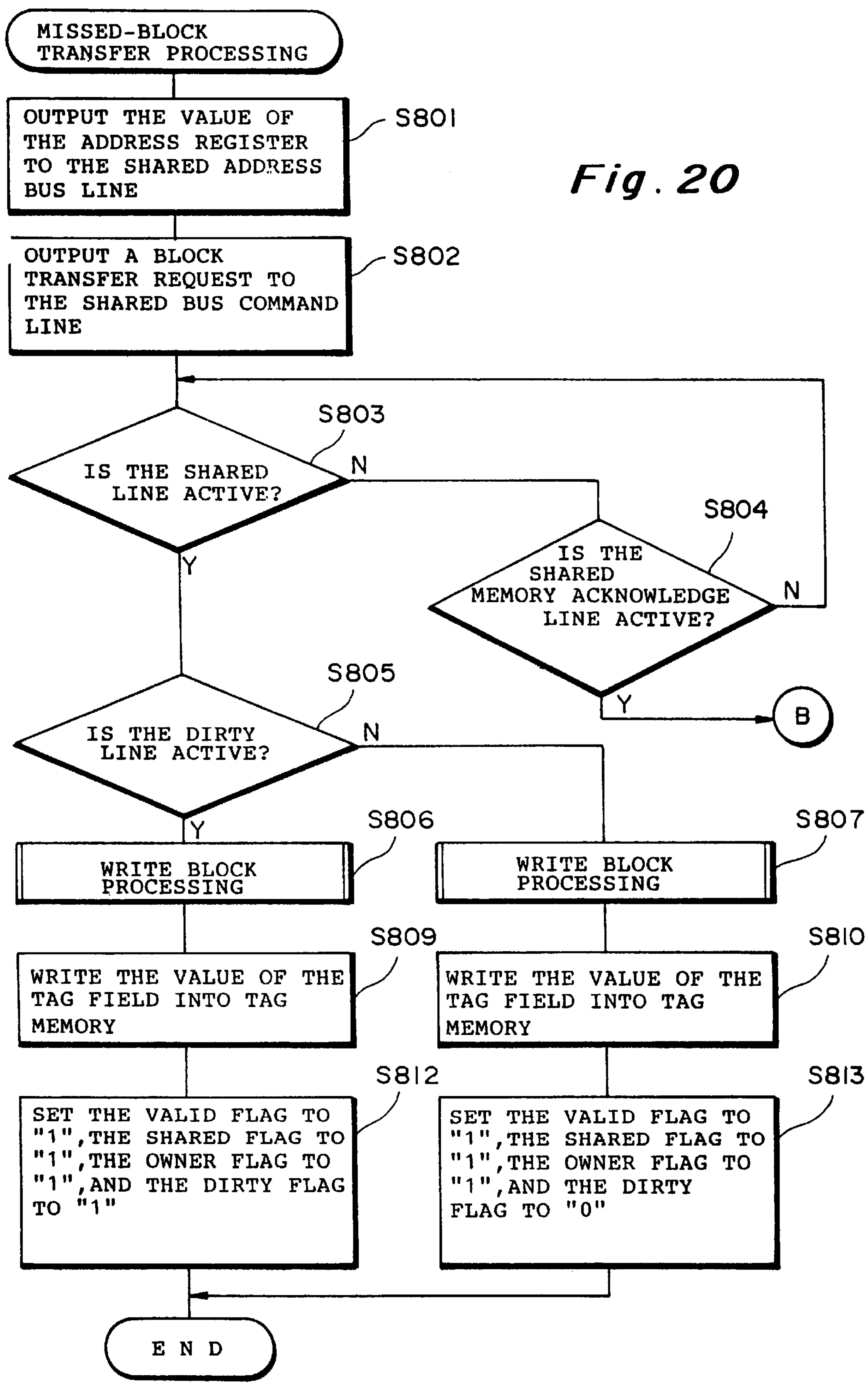
FIG. 20 is a flowchart (1/2) showing the block transfer processing which is performed when a miss hit occurs in the second embodiment of the snoop cache memory control system according to this invention.
Figure 21:
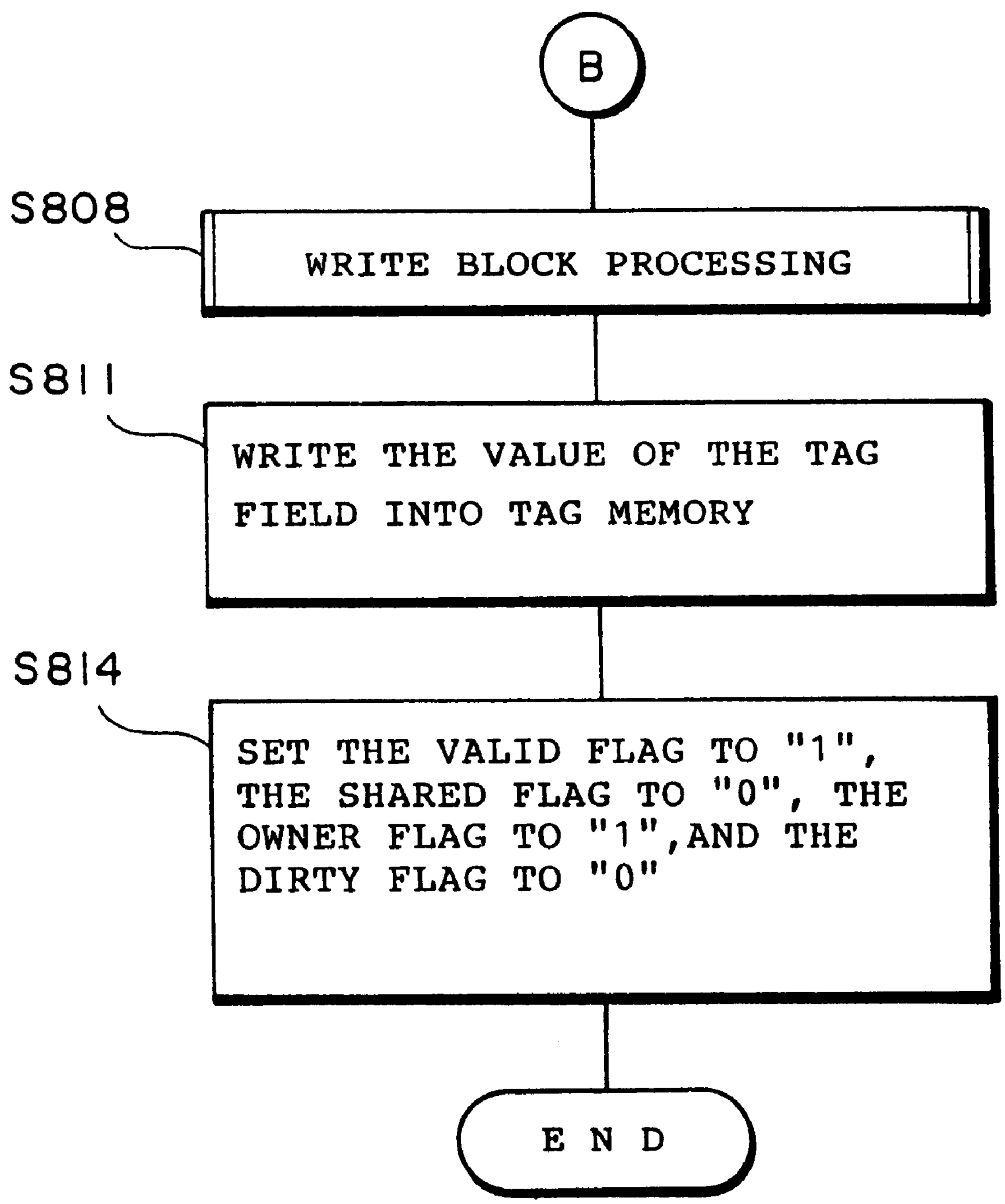
FIG. 21 is a flowchart (2/2) showing the block transfer processing which is performed when a miss hit occurs in the second embodiment of the snoop cache memory control system according to this invention.

FIGS. 20 and 21 are flowcharts sowing how a missed block is transferred. The module outputs the value of the address register 10 to the shared address bus line 81 (step S801), and a block transfer request to the shared bus command line 83 (step S802). When either the shared line 89 or the shared memory acknowledge line 84 becomes active, the module writes the value of the shared data bus line 82 into the cache memory 15 (steps S803 to step S808). The description of block write-back processing is omitted here because it is the same as in the flowchart in FIG. 10.

In FIGS. 20 and 21 again when the module writes the last data, it writes the value of the tag field 41 into the tag memory 13*a* indicated by the index field 42 of the address register 10 (steps S809, S810, S811) and, at the same time, writes the status information into the status memory 14 indicated by the index field 42 of the address register 10 (steps S812, S813, S814).

The status values are as follows. When the shared line 89 is active and the dirty line 88 is active, it is indicated that the block was transferred from some other snoop cache memory module and that the block was modified. In this case, the module sets the valid flag to "1", the shared flag to "1", the owner flag to "1", and the dirty flag to "1" (step S812) and transfers the ownership. Thus, the complete sequence of steps is S803, S805, S806, S809, and S812. At this time, when the dirty line 88 is not active, it is indicated that the block is not modified. In this case, the module sets the dirty flag to "0" (step S813). Thus, the complete sequence of steps is S803, S805, S807, S810 and S813.

When the shared memory acknowledge line 84 is active (step S804), it is indicated that the block was transferred from the shared memory 50 and that no snoop cache memory module has a copy of the block. In this case, the module sets the valid flag to "1", the shared flag to "0", the owner flag to "1", and the dirty flag to "0" (step S814). Thus, the complete sequence of steps is S803, S804, S808, S811 and S814.

(b) Read data processing:

The description of read data processing is omitted here because the processing is similar to the one shown in FIG. 11.

Figure 22:
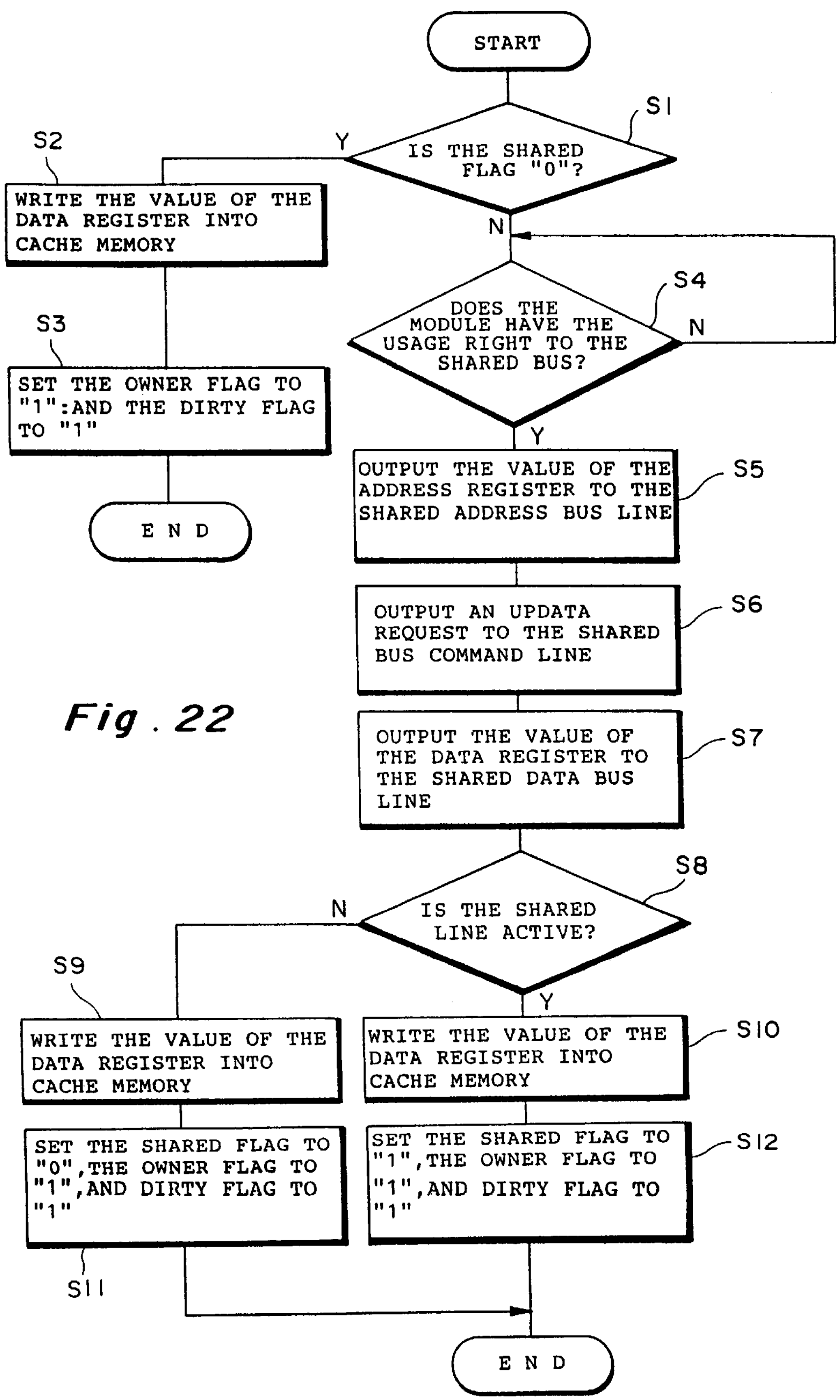
FIG. 22 is a flowchart showing the processing that is performed when a cache hit occurs upon receiving a write request from a processor in the second embodiment of the snoop cache memory control system according to this invention.

(3) A cache hit occurs upon receiving a write request from the processor 62:

FIG. 22 is a flowchart showing the processing that is performed when a cache hit occurs upon receiving a write request from the processor 62.

When the shared flag of the block is "0" in step S1, the snoop cache memory module 61 writes data locally. First, the cache control module 18 writes the value of the data register 16 into the cache memory 15 specified by the index field 42 and the block offset field 43 of the address register address register 10 (step S2). At the same time, the cache control module 18 sets the owner flag in the status memory 14 specified by the index field 42 of the address register 10 to "1", and the dirty flag to "1" (step S3).

On the other hand, when the shared flag is "1" in step S1, the update control module 18*b* of the cache control module 18 issues an update request to other snoop cache memory modules having a copy of the same data. The module performs this processing as follows. First, the module obtains the bus usage right for the shared bus 80 (step S4). Then, it outputs the value of the address register 10 to the shared address bus line 81 (step S5) and, at the same time, outputs an update request to the shared bus command line 83 (step S6). In the next cycle, it outputs the value of the data register 16 to the shared data bus line 82 (step S7) and writes data as in steps S2 and S3 described above (steps S8–S12).

The module sets status information in the status memory 14 as follows. When the shared line 89 is active, it is indicated that some other cache memory contains the block. In this case, the module sets the shared flag to "1", the owner flag to "1", and the dirty flag to "1" (steps S8, S10 and S12).

When the shared line 89 is inactive, it is indicated that there is no cache memory containing the block. In this case, the module sets the shared flag to "0", the owner flag to "1", and the dirty flag to "1" (step S8, S9 and S11).

(4) A cache miss occurs upon receiving a write request from the processor 62:

In this case, the module performs the same processing as the block replacement processing that is performed when a cache miss occurs upon receiving a read request from the processor and then performs the same processing as the one that is performed when a cache hit occurs upon receiving a write request.

(5) A cache hit occurs upon receiving a block transfer request from the shared bus 80:

FIG. 23 is a flowchart showing the processing that is performed when a cache hit occurs upon receiving a block transfer request from the shared bus 80.

When the owner flag in the status memory 14 indicated by the shared address register 11 is "1" in step S1, the block is transferred from this snoop cache memory module. First, the module activates the shared line 89 (step S2), and outputs the value of the cache memory specified by the shared address register 11 to the shared data bus line 82 (step S5). At this time, when the dirty flag is "1", the module also activates the dirty line 88 (steps S3 and S4). In addition, the module increments the value of the block offset field 43 every cycle to output one block of data (steps S6, S7). When the module outputs the last data, it sets the shared flag to "1", the owner flag to "0", and the dirty flag to "0" in the status memory 14 indicated by the shared address register 11 (step S8) to pass the ownership to the transfer requesting cache memory.

On the other hand, when the owner fag is "0", the module activates the shared line 89 to inform the transfer requesting cache memory that the cache memory has the block, but does not transfer the block (step S9).

Figure 24:
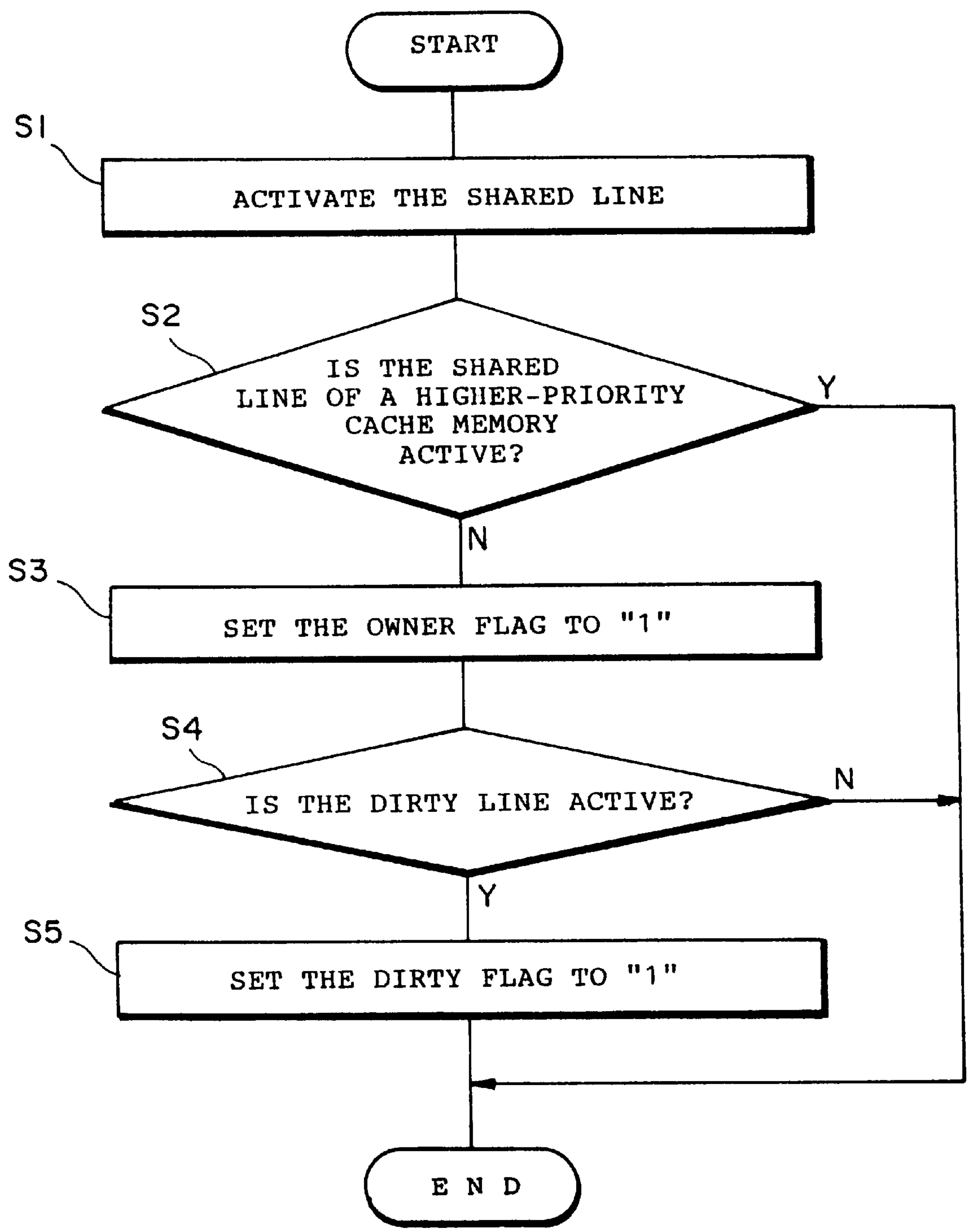
FIG. 24 is a flowchart showing the processing that is performed when a cache hit occurs upon receiving an owner delivery request from the shared bus in the second embodiment of the snoop cache memory control system according to this invention.

(6) A cache hit occurs upon receiving an ownership delivery request from the shared bus 80:

FIG. 24 is a flowchart showing the processing. First, the ownership delivery control module 21*b* activates the shared line 89 (step S1). In addition, the high-priority cache memory hit determination module 21*a* checks if the shared line 89 of a higher-priority cache memory is active (step S2). If there is no cache memory with a higher priority, the ownership delivery control module 21*b* sets to "1" the owner flag in the status memory 14 indicated by the shared address register 11 (step S2, S3) to become the owner of the block. When the dirty line 88 is active, the module also sets the dirty flag to "1" (steps S4, S5).

Figure 25:
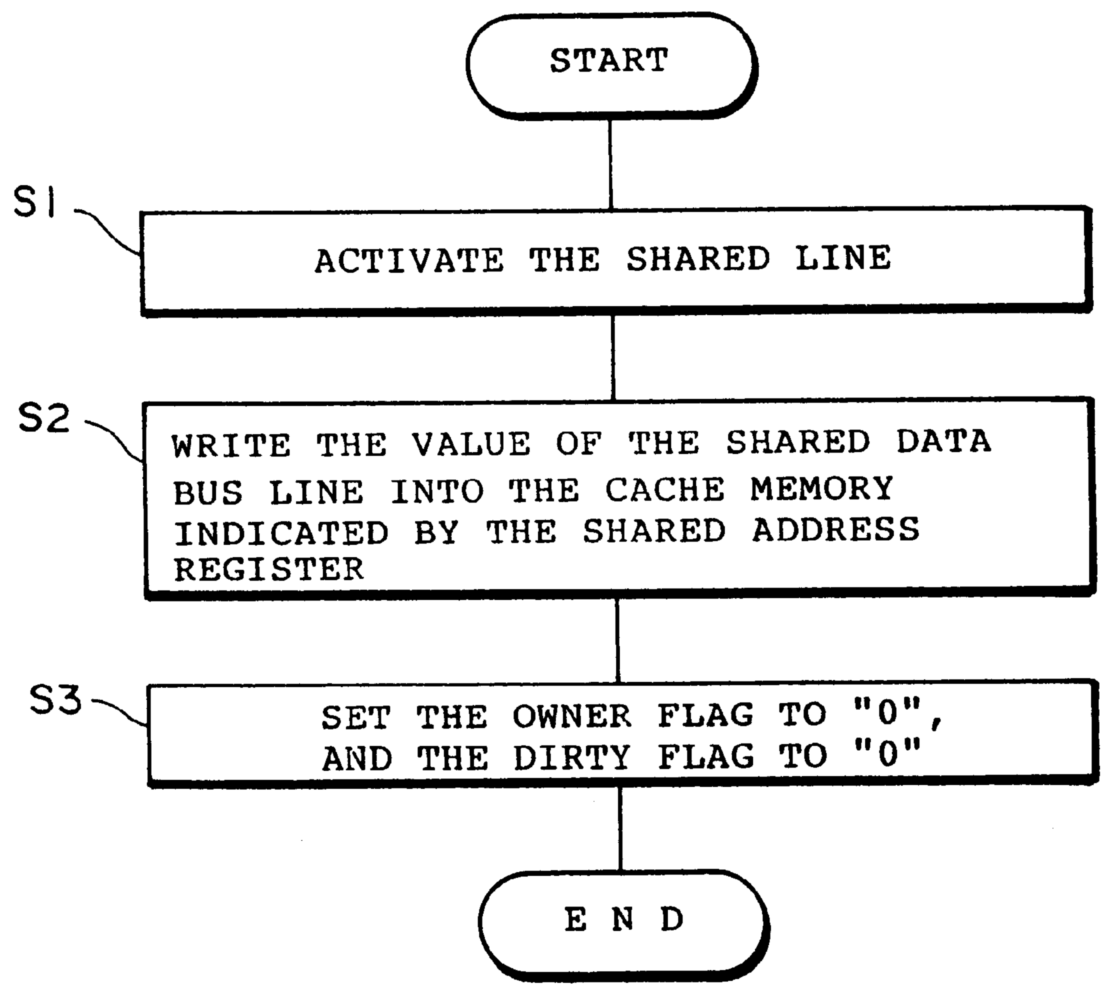
FIG. 25 is a flowchart showing the processing that is performed when a cache hit occurs upon receiving an update request from the shared bus in the second embodiment of the snoop cache memory control system according to this invention.

(7) A cache hit occurs upon receiving an update request from the shared bus 80:

FIG. 25 is a flowchart showing the processing.

In this processing, the module activates the shared line 89 (step S1), writes the value of the shared data bus line 82 into the cache memory indicated by he shared address register 11 (step S2), and sets the owner flag and the dirty flag in the status memory 14 to "0".

In the second embodiment, if, when a cache miss occurs or a block of data must be written back to the shared memory 50, there is some other snoop cache memory module containing a copy of the same data, the ownership is delivered to that snoop cache memory module. In addition, if there are a plurality of snoop cache memory modules, each with a priority, capable of receiving the ownership, a snoop cache memory module becomes the owner only when no higher-priority snoop cache memory modules respond to the ownership delivery request. This makes it possible for the owner of the block to survive in one of the cache memories until the last copy is written back to the memory. This allows a block of data to be transferred between snoop cache memory modules when a cache miss occurs as long as the block of data is in one of them, and delays the write-back of a modified block to the shared memory 50 until the last copy of data is expelled. As a result, the snoop cache memory module control system in the second embodiment minimizes the number of times access must be made to the shared memory 50 when a cache miss occurs or a block of data must be written back to the shared memory 50, reducing the latency time upon occurrence of a cache miss or the volume of traffic on the bus.

In the above embodiments, the snoop cache memory control system according to this invention is applied to a shared bus multiprocessor system. However, it is to be understood that the invention is not limited to the specific embodiments thereof but may be applied to other systems such the caching of a distributed file system.

What is claimed is:

1. A snoop cache memory control system having a plurality of cache memory modules each corresponding to a processor and each connecting to a shared memory, wherein, upon occurrence of a cache miss in one of the cache memories, a cache memory with the ownership of a missed data block, called the owner of the data block, transfers the data block to the cache memory experiencing the cache miss, wherein, upon expelling a data block, the owner writes back the data block to the shared memory if the data block does not match the corresponding data block in the shared memory, and wherein data consistency is maintained among the cache memories, each snoop cache memory module comprising:

a previous-owner number storage module containing the number of a cache memory of the previous owner; and a cache control module referencing the previous-owner number storage module upon expelling a data block owned by the current cache memory and, if the previous-owner number storage module contains the number of one of the other cache memories and if a cache memory with the previous-owner number contains the data block to be expelled, delivering the ownership of the data block to the cache memory with the previous-owner number.

2. A snoop cache memory control system as set forth in claim 1, wherein the cache control module has an ownership delivery control module checking if, upon expelling a data block, at least one of the other cache memories contains a copy of the data block to be expelled, referencing the previous-owner number storage module if at least one of the other cache memories has a copy of the data block, sending, if the previous-owner number storage module contains the number of one of the cache memories, the number and an ownership delivery request to all the cache memories, receiving an ownership delivery request and, if the owner number specified by the request indicates the cache memory and if the cache memory contains a copy of data block associated with the ownership delivery request, making the cache memory the owner of the data block.

3. A snoop cache memory control system as set forth in claim 2, wherein the cache control module has a block transfer control module causing, when transferring a data block between a source cache memory and a destination cache memory upon occurrence of a cache miss, the source cache memory to send the number of the cache memory and an ownership delivery request to the destination cache memory and causing the destination cache memory to make itself the owner of the data block according to the received ownership delivery request and, at the same time, to store the number of the source cache memory in the previous-owner number storage module.

4. A snoop cache memory control system as set forth in claim 3, wherein the cache control module has an update control module causing, when modifying a data block in the cache memory and if the owner of the data block is one of the other cache memories, the cache memory to send an update request for the data block to the owner and, when receiving an ownership delivery request in response to the update request from the owner, causing the cache memory to make itself the owner of the data block and, at the same time, to store in the previous-owner number storage module the number of the cache memory sending the ownership delivery request.

5. A snoop cache memory control system as set forth in claim 2, wherein the cache control module has an update control module causing, when modifying a data block in the cache memory and if the owner of the data block is one of the other cache memories, the cache memory to send an update request for the data block to the owner and, when receiving an ownership delivery request in response to the update request from the owner, causing the cache memory to make itself the owner of the data block and, at the same time, to store in the previous-owner number storage module the number of the cache memory sending the ownership delivery request.

6. A snoop cache memory control system as set forth in claim 1, wherein the cache control module has a block transfer control module causing, when transferring a data block between a source cache memory and a destination cache memory upon occurrence of a cache miss, the source cache memory to send the number of the cache memory and an ownership delivery request to the destination cache memory and causing the destination cache memory to make itself the owner of the data block according to the received ownership delivery request and, at the same time, to store the number of the source cache memory in the previous-owner number storage module.

7. A snoop cache memory control system as set forth in claim 6, wherein the cache control module has an update control module causing, when modifying a data block in the cache memory and if the owner of the data block is one of the other cache memories, the cache memory to send an update request for the data block to the owner and, when receiving an ownership delivery request in response to the update request from the owner, causing the cache memory to make itself the owner of the data block and, at the same time, to store in the previous-owner number storage module the number of the cache memory sending the ownership delivery request.

8. A snoop cache memory control system as set forth in claim 1, wherein the cache control module has an update control module causing, when modifying a data block in the cache memory and if the owner of the data block is one of the other cache memories, the cache memory to send an update request for the data block to the owner and, when receiving an ownership delivery request in response to the update request from the owner, causing the cache memory to make itself the owner of the data block and, at the same time, to store in the previous-owner number storage module the number of the cache memory sending the ownership delivery request.

9. A snoop cache memory control system having a plurality of cache memory modules each corresponding to a processor and each connecting to a shared memory, wherein, upon occurrence of a cache miss in one of the cache memories, a cache memory with the ownership of a missed data block, called the owner of the data block, transfers the data block to the cache memory experiencing the cache miss, wherein, upon expelling a data block, the owner writes back the data block to the shared memory if the data block does not match the corresponding data block in the shared memory, and wherein data consistency is maintained among the cache memories, each snoop cache memory module comprising:

a high-priority cache memory hit determination module determining if, with an ownership delivery priority assigned to each cache memory, some other higher-priority cache memory contains a copy of data block with the address associated with an ownership delivery request received from the owner; and an ownership delivery control module sending an ownership delivery request to all the other cache memories when the cache memory is the owner of a data block to be expelled, and, when the cache memory is not the owner of a data block associated with a received ownership delivery request, making itself the owner of the copy of data block if the high-priority cache memory hit determination module determines that there is no higher-priority cache memory having a copy of data block associated with the ownership delivery request.

10. A method of controlling a snoop cache memory system having a shared memory, a shared bus, a plurality of processors, and a plurality of snoop cache memory modules, each one of the plurality of modules corresponding and being connected to a respective one of the processors and being connected to the shared memory via the shared bus, the method comprising:

storing a plurality of data blocks in the shared memory and in the modules, at corresponding addresses thereof;

for each of the plurality of data blocks, designating at least one of the plurality of modules in which the data block is stored, as an owner;

detecting an occurrence of a cache miss in the plurality of modules;

upon detection of the occurrence of a cache miss, transmitting a data block corresponding to the cache miss, from an owner of the corresponding data block, to the module where the cache miss occurred;

expelling a data block from one of the plurality of modules, if the processor to which the one module corresponds determines that it does not currently require the data block; and upon expulsion of the expelled data block writing the expelled data block to the shared memory if the data of a data block stored by an owner of a data block at the same address as the expelled data block, is not the same as the data of a data block stored by the shared memory at the same address as the expelled data block, determining which, if any, of the modules not expelling the expelled data block, is storing a data block having the same address as the expelled data block, assigning at least one of the determined modules as an owner of a data block having the same address as the expelled data block, determining if a module that is a previous owner of a data block having the same address as the expelled data block, is currently storing the data block having the same address as the expelled data block, and assigning the previous owner as a current owner of the data block having the same address as the expelled data block.

11. The method of controlling a snoop cache memory system as set forth in claim 10, further comprising assigning a module, that has received the data block corresponding to the cache miss from the owner of the data block, as an owner of the data block.

12. The method of controlling a snoop cache memory system as set forth in claim 11, further comprising:

modifying a data block stored in one of the plurality of modules, in response to a determination by the corresponding processor that the data block requires modification; and upon modifying the data block, assigning ownership of the modified data block to the module storing the modified data block.

13. The method of controlling a snoop cache memory system as set forth in claim 10, further comprising:

modifying a data block stored in one of the plurality of modules, in response to a determination by the corresponding processor that the data block requires modification; and upon modifying the data block, assigning ownership of the modified data block to the module storing the modified data block.

14. A method of controlling a snoop cache memory system having a shared memory, a shared bus, a plurality of processors, and a plurality of snoop cache memory modules, each one of the plurality of modules corresponding and being connected to a respective one of the processors and being connected to the shared memory via the shared bus, the method comprising:

storing a plurality of data blocks in the shared memory and in the modules, at corresponding addresses thereof;

for each of the plurality of data blocks, designating at least one of the plurality of modules in which the data block is stored, as an owner;

expelling a data block from one of the plurality of modules, if the corresponding processor determines that it does not currently require the data block;

upon expulsion of the data block writing the expelled data block to the shared memory if the data of a data block stored by an owner of a data block at the same address as the expelled data block, is not the same as the data of a data block stored by the shared memory at the same address as the expelled data block; and upon writing back to the shared memory determining which, if any, of the modules not expelling the expelled data block, is storing a data block having the same address as the expelled data block, assigning at least one of the determined modules as an owner of the data block having the same address as the expelled data block, determining if a module that is a previous owner of the data block having the same address as the expelled data block, is currently storing the data block having the same address as the expelled data block; and assigning the previous owner as a current owner of the data block having the same address as the expelled data block.

15. The method of controlling a snoop cache memory system as set forth in claim 14, further comprising detecting an occurrence of a cache miss in the plurality of modules;

upon detection of the occurrence of a cache miss, transmitting a data block corresponding to the cache miss, from an owner of the corresponding data block, to the module where the cache miss occurred; and assigning a module, that has received the data block corresponding to the cache miss from the owner of the data block, as an owner of the data block.

16. The method of controlling a snoop cache memory system as set forth in claim 13, further comprising:

modifying a data block stored in one of the plurality of modules, in response to a determination by the corresponding processor that the data block requires modification; and upon modifying the data block, assigning ownership of the modified data block to the module storing the modified data block.

17. The method of controlling a snoop cache memory system as set forth in claim 14, further comprising:

modifying a data block stored in one of the plurality of modules, in response to a determination by the corresponding processor that the data block requires modification; and upon modifying the data block, assigning ownership of the modified data block to the module storing the modified data block.

18. A method of controlling a snoop cache memory system having a shared memory, a shared bus, a plurality of processors, and a plurality of snoop cache memory modules, each one of the plurality of modules corresponding and being connected to a respective one of the processors and being connected to the shared memory via the shared bus, the method comprising:

storing a plurality of data blocks in the shared memory and in the modules, at corresponding addresses thereof;

for each of the plurality of data blocks, designating at least one of the plurality of modules in which the data block is stored, as an owner;

detecting an occurrence of a cache miss in the plurality of modules;

upon detection of the occurrence of a cache miss, transmitting a data block corresponding to the cache miss, from an owner of the corresponding data block, to the module where the cache miss occurred;

expelling a data block from one of the plurality of modules, if the processor to which the one module corresponds determines that it does not currently require the data block; and upon expulsion of the data block writing the expelled data block to the shared memory if the data of a data block stored by an owner of a data block at the same address as the expelled data block, is not the same as the data of a data block stored by the shared memory at the same address as the expelled data block;

assigning an owner delivery priority to each of the snoop cache memory modules; and upon expulsion of the expelled data block, transferring ownership of the expelled data block to the module with the highest-priority that is not an owner of the data block with the same address as that of the expelled data block.

19. A method of controlling a snoop cache memory system having a shared memory, a shared bus, a plurality of processors, and a plurality of snoop cache memory modules, each one of the plurality of modules corresponding and being connected to a respective one of the processors and being connected to the shared memory via the shared bus, the method comprising:

storing a plurality of data blocks in the shared memory and in the modules, at corresponding addresses thereof;

for each of the plurality of data blocks, designating at least one of the plurality of modules in which the data block is stored, as an owner;

expelling a data block from one of the plurality of modules, if the corresponding processor determines that it does not currently require the data block;

upon expulsion of the expelled data block writing the expelled data block to the shared memory if the data of a data block stored by an owner of a data block at the same address as the expelled data block, is not the same as the data of a data block stored by the shared memory at the same address as the expelled data block;

assigning an owner delivery priority to each of the modules; and upon the expulsion of the expelled data block, transferring ownership of the expelled data block to the module with the highest-priority that is not an owner of the data block with the same address as that of the expelled data block.

* * * * *